(12) United States Patent
Haizuka et al.

(10) Patent No.: US 12,391,842 B2
(45) Date of Patent: Aug. 19, 2025

(54) INK SET, RECORDING APPARATUS, AND RECORDING METHOD

(71) Applicant: SEIKO EPSON CORPORATION, Tokyo (JP)

(72) Inventors: Shiho Haizuka, Shiojiri (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 180 days.

(21) Appl. No.: 18/347,901

(22) Filed: Jul. 6, 2023

(65) Prior Publication Data

US 2024/0010863 A1 Jan. 11, 2024

(30) Foreign Application Priority Data

Jul. 7, 2022 (JP) .................................. 2022-109774

(51) Int. Cl.
| | |
|---|---|
| C09D 11/54 | (2014.01) |
| B41J 2/01 | (2006.01) |
| B41J 2/04 | (2006.01) |
| B41M 5/00 | (2006.01) |
| B41M 5/36 | (2006.01) |
| C09D 11/106 | (2014.01) |

(Continued)

(52) U.S. Cl.
CPC ................. C09D 11/40 (2013.01); B41J 2/04 (2013.01); B41M 5/0017 (2013.01); B41M 5/0023 (2013.01); B41M 5/36 (2013.01); C09D 11/106 (2013.01); C09D 11/107 (2013.01); C09D 11/12 (2013.01); C09D 11/30 (2013.01); C09D 11/32 (2013.01); C09D 11/322 (2013.01); C09D 11/38 (2013.01); C09D 11/54 (2013.01); B41J 2/01 (2013.01); B41M 5/00 (2013.01)

(58) Field of Classification Search
CPC ..... C09D 11/40; C09D 11/106; C09D 11/107; C09D 11/12; C09D 11/30; C09D 11/32; C09D 11/322; C09D 11/38; C09D 11/54; B41J 2/04; B41J 2/01; B41M 5/0017; B41M 5/0023; B41M 5/36; B41M 5/00
See application file for complete search history.

(56) References Cited

U.S. PATENT DOCUMENTS

| | | | |
|---|---|---|---|
| 2007/0046720 A1* | 3/2007 | Konno | ............... B41J 11/00214 347/21 |
| 2016/0082763 A1 | 3/2016 | Okuda | |
| 2019/0264056 A1* | 8/2019 | Okuda | ................... B41J 2/2114 |

FOREIGN PATENT DOCUMENTS

| | | | |
|---|---|---|---|
| JP | 2016-064640 A | 4/2016 | |
| JP | 2016203470 A | * 12/2016 | ............. C09D 11/10 |

* cited by examiner

Primary Examiner — Yaovi M Ameh
(74) Attorney, Agent, or Firm — Harness, Dickey & Pierce, P.L.C.

(57) ABSTRACT

An ink set according to one embodiment of the present disclosure includes: a water-based ink composition containing a colorant; a first treatment liquid containing an aggregating agent; and a second treatment liquid containing an aggregating agent. In the ink set described above, a content of the aggregating agent in the first treatment liquid is 0.60 mol/kg or more, a content of the aggregating agent in the second treatment liquid is less than 0.60 mol/kg, the first treatment liquid is used together with the ink composition for recording on a recording medium which is a low-permeable substrate, and the second treatment liquid is used together with the ink composition for recording on a recording medium which is an impermeable substrate.

16 Claims, 3 Drawing Sheets

(51) Int. Cl.
*C09D 11/107* (2014.01)
*C09D 11/12* (2006.01)
*C09D 11/30* (2014.01)
*C09D 11/32* (2014.01)
*C09D 11/322* (2014.01)
*C09D 11/38* (2014.01)
*C09D 11/40* (2014.01)

INK SET, RECORDING APPARATUS, AND RECORDING METHOD

The present application is based on, and claims priority from JP Application Serial Number 2022-109774, filed Jul. 7, 2022, the disclosure of which is hereby incorporated by reference herein in its entirety.

BACKGROUND

1. Technical Field

The present disclosure relates to an ink set, a recording apparatus, and a recording method.

2. Related Art

Since being able to record a highly fine image by a relatively simple apparatus, an ink jet recording method has been rapidly developed in various fields. Among recent developments, various studies have been carried out, for example, on formation of an image having a higher image quality.

For example, JP-A-2016-064640 has disclosed a recording method including a step of adhering a color ink composition which contains a colorant and a resin and a reaction liquid which contains an aggregating agent to aggregate at least one component of the color ink composition to a recording medium such as coated paper.

However, between recording on a low-permeable substrate such as coated paper and recording on an impermeable substrate such as a film, qualities, such as an image quality (in particular, burying property and granularity) and an abrasion resistance, of recorded matters are different from each other. That is, in both a recorded matter including a low-permeable substrate and a recorded matter including an impermeable substrate, excellent image quality (burying property and granularity) and abrasion resistance are difficult to obtain.

SUMMARY

According to an aspect of the present disclosure, there is provided an ink set comprising: a water-based ink composition containing a colorant; a first treatment liquid containing an aggregating agent; and a second treatment liquid containing an aggregating agent. In the ink set described above, a content of the aggregating agent in the first treatment liquid is 0.60 mol/kg or more, a content of the aggregating agent in the second treatment liquid is less than 0.60 mol/kg, the first treatment liquid is used together with the ink composition for recording on a recording medium which is a low-permeable substrate, and the second treatment liquid is used together with the ink composition for recording on a recording medium which is an impermeable substrate.

According to another aspect of the present disclosure, there is provided a recording apparatus which performs recording on a recording medium and which includes the ink set according to the aspect described above, and the recording described above includes a first recording to perform recording on a recording medium which is a low-permeable substrate using the ink composition and the first treatment liquid and a second recording to perform recording on a recording medium which is an impermeable substrate using the ink composition and the second treatment liquid.

According to another aspect of the present disclosure, there is provided a recording method which performs recording on a recording medium using the ink set according to the aspect described above and which comprises a step of selecting a treatment liquid used for the recording from the first treatment liquid and the second treatment liquid, a step of adhering the selected treatment liquid to the recording medium, and a step of adhering the ink composition to the recording medium, and the recording described above is a first recording in which the selected treatment liquid is the first treatment liquid and the recording medium is a low-permeable substrate or a second recording in which the selected treatment liquid is the second treatment liquid and the recording medium is an impermeable substrate.

DESCRIPTION OF EXEMPLARY EMBODIMENTS

Figure 1:
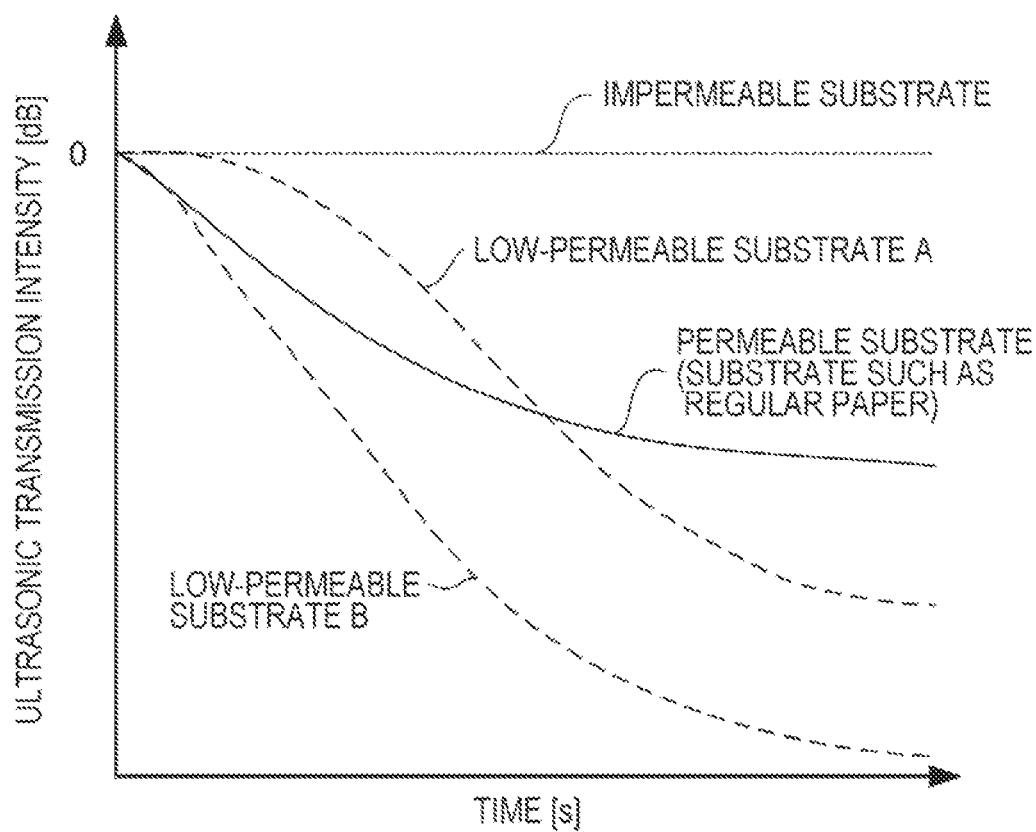
FIG. 1 is graph schematically showing the changes in ultrasonic transmission intensity with time obtained from a low-permeable substrate, an impermeable substrate, and a permeable substrate.

Hereinafter, embodiments of the present disclosure will be described. The following embodiments are described to explain examples of the present disclosure. The present disclosure is not limited at all to the following embodiments but also includes various types of modified embodiments to be performed without departing from the scope of the present disclosure. In addition, the following constituents described below are not always required to be essential constituents of the present disclosure.

1. Ink Set

An ink set according to one embodiment of the present disclosure includes a water-based ink composition containing a colorant; a first treatment liquid containing an aggregating agent; and a second treatment liquid containing an aggregating agent, a content of the aggregating agent in the first treatment liquid is 0.60 mol/kg or more, a content of the aggregating agent in the second treatment liquid is less than 0.60 mol/kg, the first treatment liquid is used together with the ink composition for recording on a recording medium which is a low-permeable substrate, and the second treatment liquid is used together with the ink composition for recording on a recording medium which is an impermeable substrate.

In the recording on a low-permeable substrate, such as coated paper, and the recording on an impermeable substrate, such as a film, although the substrates described above are recording media similar to each other in terms of poor liquid absorption, the qualities obtained therefrom are different from each other, and from the two types of substrates described above, excellent image quality and abrasion resistance are difficult to obtain. Recently, through intensive research on liquid permeability in a low-permeable substrate, it was found that after a predetermined time passes from the landing of a liquid droplet thereon, the permeability of the liquid tends to become rather high as compared to that in a substrate, such as regular paper. That is, it is suggested that in the recording medium which is a low-permeable substrate, since the permeability of the treatment liquid is increased with time, a reaction with the ink may not sufficiently occur, and as a result, the quality obtained from the above low-permeable substrate is made different from that obtained from the impermeable substrate. Accordingly, in the recording on a low-permeable substrate, it was found that the reactivity between the ink and the treatment liquid is required to be further increased. On the other hand, in the recording on an impermeable substrate, when the reactivity between the ink and the treatment liquid is excessively high, the image quality, such as granularity, and the abrasion resistance are degraded, and hence, the reactivity described above is required to be controlled to the minimum necessary.

In the case described above, for the control of the reactivity, a control method in which an adhesion amount of the treatment liquid is changed may also be considered. However, when the adhesion amount of the treatment liquid is small, the treatment liquid is not likely to be uniformly adhered, and in particular, when an ink jet coating is performed, the liquid droplets are sparsely ejected, and as a result, the treatment liquid droplets and the ink droplets may not be brought into contact with each other in some cases. On the other hand, when the adhesion amount of the treatment liquid is large, since the liquid adhesion amount is increased, a drying property is degraded, and as a result, the abrasion resistance may be degraded in some cases.

Hence, through intensive research carried out by the present inventors, the structure was finally formed such that a treatment liquid containing an aggregating agent at a high concentration and a treatment liquid containing an aggregating agent at a low concentration are prepared, and one of the treatment liquids described above selected in accordance with a recording medium on which recording is to be performed is used. As a result, in both a recorded matter including a low-permeable substrate and a recorded matter including an impermeable substrate, excellent image quality (burying property and granularity) and abrasion resistance can be obtained.

In the present disclosure, the "ink set" indicates at least two types of inks (including the treatment liquid) used as a set in a recording apparatus. The ink composition, the first treatment liquid, and the second treatment liquid, which are at least included in the ink set, may be received in separate ink containers or in separate chambers of an integrated ink container. In addition, the inks included in the ink set are each preferably an ink jet ink to be ejected by an ink jet method.

The ink set according to this embodiment at least includes at least one (type) ink composition, at least one (type) first treatment liquid, and at least one (type) second treatment liquid. In addition, the number of at least one selected from the group consisting of the ink composition, the first treatment liquid, and the second treatment liquid may be at least two.

1.1. Recording Medium

In the ink set according to this embodiment, the first treatment liquid is a liquid to be used together with the ink composition for recording on a recording medium which is a low-permeable substrate, and the second treatment liquid is a liquid to be used together with the ink composition for recording on a recording medium which is an impermeable substrate.

The low-permeable substrate preferably satisfies the following equation (1) when a permeability in the low-permeable substrate measured 60 seconds after water dripping is represented by A, and the impermeable substrate preferably does not satisfy the following equation (1) when a permeability in the impermeable substrate measured 60 seconds after water dripping is represented by A. Accordingly, more excellent image quality (burying property and granularity) and abrasion resistance tends to be obtained.

$$10 \log_{10}(A/A_0) < -5 \text{ [dB]} \qquad \text{Equation (1)}$$

In the above equation, $A_0$ represents a permeability in a standard substrate measured 60 seconds after water dripping, and A represents a permeability in an object substrate measured 60 seconds after water dripping.

The dynamic permeability in the above equation (1) is obtained, as the permeability of water in the substrate, by measuring an ultrasonic transmissibility. For example, when the substrate is softened in association with liquid absorption, the ultrasonic transmission intensity is decreased. Hence, the liquid permeability at a certain time can be measured such that after the substrate is immersed in a measurement water bath, the change in ultrasonic transmission signal is measured.

In addition, for the measurement of the permeability, for example, a dynamic permeability tester DPM33 or DPM30 (manufactured by emco) may be used.

FIG. 1 is a graph schematically showing the changes in ultrasonic transmission intensity with time in a low-permeable substrate, an impermeable substrate, and a permeable substrate. For example, as shown in FIG. 1, the ultrasonic transmission intensity (permeability) in the impermeable substrate tends to be constant regardless of elapsed time. On the other hand, for example, as shown in FIG. 1, the ultrasonic transmission intensity (permeability) in the low-permeable substrate is low for a while after the liquid droplet is landed but is then increased after a predetermined period of time elapses (low-permeable substrate A) or tends to be increased immediately after the liquid droplet is landed (low-permeable substrate B).

In addition, although the substrate (permeable substrate), such as regular paper, has been believed to have a higher permeability than that of the low-permeable substrate, it was found that as shown in FIG. 1, when the elapsed time after the landing of the liquid droplet is increased, the permeability in the low-permeable substrate tends to be higher than that of the substrate, such as regular paper. This phenomenon suggests that in the recording medium which is a low-permeable substrate, the permeability of the treatment liquid is increased with time, and as a result, the reactivity thereof with the ink may become insufficient in some cases as compared to that of the substrate, such as regular paper.

In the above equation (1), the standard substrate is preferably an impermeable substrate and is more preferably a poly(ethylene terephthalate) film. As the standard substrate as described above, for example, "PET50A" may be used.

A $10 \log_{10}$ ($A/A_0$) value of the above equation (1) in the low-permeable substrate is preferably less than −5 [dB], more preferably less than −7 [dB], even more preferably less than −8 [dB], further preferably less than −8.5 [dB], and particularly preferably −9 [dB] or less. Although not particularly limited, a lower limit of the above value is preferably −20 [dB] or more.

A $10 \log_{10}$ ($A/A_0$) value of the above equation (1) in the impermeable substrate is preferably −5 [dB] or more, more preferably −3 [dB] or more, further preferably −1 [dB] or more, and particularly preferably 0 [dB].

A $10 \log_{10} (A/A_0)$ value of the above equation (1) in the permeable substrate is preferably less than −5 [dB] to more than −9 [dB], more preferably less than −5 [dB] to more than −8 [dB], and further preferably less than −5 [dB] to more than −7 [dB].

A $10 \log_{10} (A/A_0)$ value of the above equation (1) in the low-permeable substrate measured 10 seconds after water dripping instead of measured 60 seconds thereafter is preferably less than −0 [dB], more preferably less than −0.5 [dB], and further preferably −1 [dB] or less. A lower limit of the above value is preferably more than −4 [dB], more preferably more than −3 [dB], and further preferably more than −2 [dB].

A $10 \log_{10} (A/A_0)$ value of the above equation (1) in the impermeable substrate measured 10 seconds after water dripping instead of measured 60 seconds thereafter is preferably more than −1 [dB], more preferably −0.5 [dB] or more, and further preferably 0 [dB].

A $10 \log_{10} (A/A_0)$ value of the above equation (1) in the permeable substrate measured 10 seconds after water dripping instead of measured 60 seconds thereafter is preferably less than −1 [dB], more preferably less than −2 [dB], further preferably less than −3 [dB], and particularly preferably −4 [dB] or less. Although not particularly limited, a lower limit of the above value is preferably −10 [dB] or more.

In addition, the low-permeable substrate or the impermeable substrate is preferably a low-absorbing substrate having a low absorbing property of a liquid, such as the ink or the treatment liquid, or a non-absorbing substrate having no absorbing property thereof, respectively. In a quantitative point of view, the low-absorbing substrate or the non-absorbing substrate indicates a substrate having a water absorption amount of 10 mL/m² or less from a contact start to 30 mseconds$^{1/2}$ by Bristow method. This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000.

On the other hand, the permeable substrate is preferably an absorbing substrate having a water absorption amount of more than 10 mL/m² from a contact start to 30 mseconds$^{1/2}$ measured by Bristow method.

1.1.1. Low-Permeable Substrate

As the low-permeable substrate, a substrate which satisfies the above equation (1) and which includes a support member and a coated layer provided on at least one surface thereof is preferable. For example, when the support member is formed from paper, for example, printing paper, such as art paper, coated paper, or mat paper, may be mentioned, and when the support member is formed from a plastic film, there may be mentioned a substrate in which a coating layer of a hydrophilic polymer is provided on a surface of a poly(vinyl chloride), a poly(ethylene terephthalate), a polycarbonate, a polystyrene, a polyurethane, a polyethylene, a polypropylene, or the like, or a substrate in which a coating layer formed from a binder and particles of a silica, a titanium oxide, or the like is provided on the surface of one of those described above.

[Support Member]

Although the support member is not particularly limited, for example, there may be mentioned paper primarily formed from wood fibers or a sheet-shaped material primarily formed from wood fibers and synthetic fibers. The paper is not particularly limited, and for example, wood pulp or waste paper pulp may be used.

The support member may contain a filler. As the filler, for example, a white pigment which will be described later may be used.

When the support member is formed by papermaking, an internal-additive sizing agent may also be used. As the internal-additive sizing agent, for example, there may be mentioned a neutral rosin-based sizing agent used for neutral papermaking, an alkenyl succinic anhydride (ASA), an alkyl ketene dimer (AKD), or a petroleum resin-based sizing agent.

[Coating Layer]

The coating layer contains pigment particles and a binder. Furthermore, if needed, a cationic compound, a surfactant, and other components may also be contained.

(Pigment Particles)

As the pigment particles, inorganic particles or a mixture containing inorganic particles and organic particles in combination may be used.

As the inorganic particles, for example, there may be mentioned kaolin, talk, heavy calcium carbonate, light calcium carbonate, calcium sulfite, amorphous silica, titanium white, magnesium carbonate, titanium dioxide, aluminium hydroxide, calcium hydroxide, magnesium hydroxide, zinc hydroxide, or chlorite.

As the organic particles, for example, there may be mentioned a water-soluble dispersion of styrene-acrylic copolymer particles, styrene-butadiene copolymer particles, polystyrene particles, polyethylene particles, or the like. One type of those organic particles may be used alone, or at least two types thereof may be used in combination.

An addition amount of the organic particles with respect to a total mass of the pigment particles in the coating layer is preferably 2 to 20 percent by mass. A volume average particle diameter (D50) of the organic particles is preferably 0.2 to 3.0 μm.

(Binder)

As the binder, a water-based resin is preferably used. As the water-based resin as described above, a resin similar to a resin of resin particles contained in the ink composition which will be described later may be used.

An addition amount of the water-based resin with respect to the total mass of the pigment particles in the coating layer is preferably 2 to 100 percent by mass and more preferably 3 to 50 percent by mass.

(Cationic Compound)

The coating layer may contain a cationic compound. As the cationic compound, for example, a cationic resin (cationic polymer) or a cationic surfactant may be used, and a cationic resin is more preferable. As the cationic compound as described above, a compound similar to a cationic compound to be contained in the first treatment liquid which will be described later may be used.

A dry adhesion amount of the cationic compound is preferably 0.3 to 2.0 g/m².

(Surfactant)

As the surfactant, a surfactant similar to a surfactant to be contained in the ink composition which will be described later may be used.

An addition amount of the surfactant with respect to a total mass of the cationic compound is preferably 10 percent by mass or less and more preferably 1 percent by mass or less. Although not particularly limited, a lower limit of the addition amount described above is preferably 0.1 percent by mass or more.

(Other Components)

As other components, for example, there may be mentioned additives, such as an alumina powder, a pH adjuster, an antiseptic agent, and an antioxidant.

(Formation Method)

A formation method of the coating layer may be performed by a method in which a support member is coated with a coating layer liquid or is immersed therein. An immersion method or a coating method of the coating layer liquid is not particularly limited, and for example, there may be mentioned a coating method using various types of coating machines, such as a conventional size press, a gate roll size press, a film transfer size press, a blade coater, a rod coater, an air knife coater, or a curtain coater; or a method to be performed by an on-machine system such that immersion or adhesion is carried out using a conventional size press, a gate roll size press, a film transfer size press, or the like.

An adhesion amount of the coating layer liquid on a solid content basis is preferably 0.5 to 20 g/m² and more preferably 1 to 15 g/m².

After the immersion or the coating, if needed, drying may also be performed, and in this case, for example, a drying temperature is preferably 100° C. to 250° C.

In the low-permeable substrate, furthermore, a back layer on a rear surface of the support member and/or another layer between the support member and the coating layer or between the support member and the back layer may be further formed, and a protective layer may also be provided on the coating layer. The layers described above each may be formed from a single layer or a plurality of layers.

1.1.2. Impermeable Substrate

As the impermeable substrate, there may be mentioned a substrate which does not satisfy the above equation (1) and in which a recording surface layer preferably contains a plastic and is more preferably formed from a plastic. In addition, the surface of the recording surface layer is a surface not provided with an absorbing layer or a receiving layer to absorb a liquid. For example, there may be mentioned a substrate in which a plastic is coated on a base material such as paper, a substrate in which a plastic film is adhered to a base material such as paper, or a plastic film including neither absorbing layer nor receiving layer. As the plastic described above, for example, a poly(vinyl chloride), a poly(ethylene terephthalate), a polycarbonate, a polystyrene, a polyurethane, a polyethylene, or a polypropylene may be mentioned.

1.1.3. Permeable Substrate

As the permeable substrate, as described above, the 10 log 10 (A/A0) value of the above equation (1) is preferably less than −5 to more than −9 [dB], more preferably less than −5 to more than −8 [dB], and further preferably less than −5 to more than −7 [dB]. In addition, the permeable substrate is preferably a water absorbing substrate having a water absorption amount of more than 10 mL/m² from a contact start to 30 mseconds$^{1/2}$ by Bristow method.

As a concrete example of the permeable substrate, for example, regular paper, recycled paper, high-quality paper, or recording paper, such as ink jet recording exclusive paper; or a cloth may be mentioned.

The first treatment liquid included in the ink set according to this embodiment may also function as a treatment liquid to be used together with the ink composition for recording on a recording medium which is a permeable substrate. According to the ink set of this embodiment, even on the permeable substrate, excellent image quality (such as burying property and granularity) and abrasion resistance can be obtained.

Hereinafter, components contained in the first treatment liquid, the second treatment liquid, and the ink composition, which are included in the ink set according to this embodiment, will be described.

1.2. First Treatment Liquid

The first treatment liquid included in the ink set according to this embodiment contains an aggregating agent at a content of 0.60 mol/kg or more and is used together with the ink composition for recording on the recording medium which is a low-permeable substrate.

In the recording medium which is a low-permeable substrate, it was recently found that since the permeability of the treatment liquid is increased with time, a reaction thereof with the ink is insufficiently performed. Hence, in the first treatment liquid, the reactivity between the ink composition and the treatment liquid is further increased, that is, the content of the aggregating agent is set to 0.60 mol/kg or more.

1.2.1. Aggregating Agent

The first treatment liquid included in the ink set according to this embodiment contains an aggregating agent. Since reacting with components, such as a colorant and/or a resin, contained in the ink composition, the aggregating agent has a function to aggregate the components of the ink composition. In addition, since reacting with a white pigment contained in a white ink composition which will be described later, a resin contained in a clear ink composition which will be described later, and/or the like, the aggregating agent is able to aggregate the components of the white ink composition and/or the clear ink composition. By the aggregation as described above, for example, a color development property of the colorant can be increased, and/or a fixability of resin particles can be increased.

A content of the aggregating agent in the first treatment liquid is 0.60 mol/kg or more, preferably 0.65 mol/kg or more, even more preferably 0.70 mol/kg or more, further preferably 0.75 mol/kg or more, and particularly preferably 0.80 mol/kg or more. When the content of the aggregating agent is as described above, the reactivity is further improved, and the image quality, such as the burying property and the granularity, tends to be made more excellent.

In addition, although an upper limit of the content of the aggregating agent in the first treatment liquid is not particularly limited, the upper limit described above is preferably 1.5 mol/kg or less, more preferably 1.2 mol/kg or less, further preferably 1.0 mol/kg or less, and particularly preferably 0.9 mol/kg or less.

In addition, the content [mol/kg] of the aggregating agent of the present disclosure indicates the number of moles [mol] of the aggregating agent with respect to a total mass [kg] of the treatment liquid.

Although the aggregating agent is not particularly limited, for example, a metal salt, an acid, or a cationic compound may be mentioned. As the cationic compound, for example, a cationic resin (cationic polymer) or a cationic surfactant may be used. Among those mentioned above, as the metal salt, a polyvalent metal salt is preferable, and as the cationic compound, a cationic resin is preferable. As the acid, an organic acid or an inorganic acid may be mentioned, and an organic acid is preferable.

Hence, as the aggregating agent, when at least one selected from the group consisting of the cationic resin, the organic acid, and the polyvalent metal salt is used, for example, an image quality to be obtained and the abrasion resistance are preferably made more excellent.

In particular, when the polyvalent metal salt is used as the aggregating agent, for example, the image quality to be obtained and the abrasion resistance are preferably made more excellent.

(Polyvalent Metal Salt)

The polyvalent metal salt is a compound formed from a metal ion having at least two valences and an anion. As the metal ion having at least two valences, for example, there may be mentioned an ion of calcium, magnesium, copper, nickel, zinc, barium, aluminum, titanium, strontium, chromium, cobalt, or iron. Among those metal ions each forming a polyvalent metal salt, since having an excellent property of aggregating the component of the ink, a calcium ion and/or a magnesium ion is preferably selected.

As the anion forming a polyvalent metal salt, an inorganic ion or an organic ion may be mentioned. That is, the polyvalent metal salt in the present disclosure is a salt formed from a polyvalent metal and an inorganic ion or an organic ion. As the inorganic ion as described above, for example, there may be mentioned a chlorine ion, a perchlorate ion, a bromine ion, an iodine ion, a nitrate ion, a nitrite ion, a sulfate ion, a permanganate ion, a cyanide ion, a chromate ion, a tungstate ion, an arsenate ion, a hexafluorosilicate ion, a molybdate ion, a phosphate ion, or a hydroxide ion. As the organic ion, an organic acid ion may be mentioned, and for example, a carboxylate ion, a formate ion, an acetate ion, a lactate ion, a propionate ion, an ascorbate ion, an oxalate ion may be mentioned.

As a concrete example of the above polyvalent metal salt, for example, there may be mentioned calcium nitrate tetrahydrate, calcium chlorate, calcium perchlorate, calcium permanganate, calcium bromide, calcium formate, calcium nitrite, calcium chloride, calcium acetate, calcium cyanide, L-calcium lactate pentahydrate, calcium propionate, calcium ascorbate dihydrate, calcium iodide, calcium chromate, calcium oxalate, calcium hydroxide, calcium tungstate, calcium carbonate, calcium arsenate, calcium hexafluorosilicate, calcium molybdate, calcium iodate, calcium sulfate dihydrate, tricalcium phosphate, calcium hydrogen phosphate, calcium dihydrogen phosphate, magnesium sulfate, magnesium chloride, magnesium carbonate, barium sulfate, barium chloride, zinc carbonate, zinc sulfide, aluminum silicate, calcium silicate, magnesium silicate, copper nitrate, magnesium acetate, or aluminum acetate.

Those polyvalent metal salts may be used alone, or at least two types thereof may be used in combination. In addition, those metal salts each may have at least one hydrate in the form of raw material.

As a metal salt other than the polyvalent metal salt, for example, a monovalent metal salt, such as a sodium salt or a potassium salt, may be mentioned, and for example, sodium sulfate or potassium sulfate may be mentioned.

(Organic Acid)

As the organic acid, for example, there may be preferably mentioned a poly(meth)acrylic acid, acetic acid, glycolic acid, malonic acid, malic acid, maleic acid, ascorbic acid, succinic acid, glutaric acid, fumaric acid, citric acid, tartaric acid, lactic acid, a sulfonic acid, pyrrolidone carboxylic acid, pyrone carboxylic acid, pyrrole carboxylic acid, furancarboxylic acid, pyridinecarboxylic acid, coumaric acid, thiophenecarboxylic acid, nicotinic acid, or a derivative or a salt of at least one of those mentioned above. The organic acid may be used alone, or at least two types thereof may be used in combination. An organic acid salt which is also in the form of a metal salt is included in the above meal salt. An organic acid salt is also the same as described above.

As the inorganic acid, for example, sulfuric acid, hydrochloric acid, nitric acid, or phosphoric acid may be mentioned. The inorganic acid may be used alone, or at least two types thereof may be used in combination.

(Cationic Resin)

As the cationic resin (cationic polymer), for example, a cationic urethane-based resin, a cationic olefin-based resin, a cationic amine-based resin, or a cationic surfactant may be mentioned. The cationic polymer is preferably water soluble.

As the cationic urethane-based resin, a commercial product may be used, and for example, there may be used Hydran CP-7010, CP-7020, CP-7030, CP-7040, CP-7050, CP-7060, or CP-7610 (trade name, manufactured by DIC Corporation); Superflex 600, 610, 620, 630, 640, or 650 (trade name, manufactured by DKS Co., Ltd.); or urethane emulsion WBR-2120C or WBR-2122C (trade name, manufactured by Taisei Fine Chemical Co., Ltd.).

The cationic olefin-based resin is a resin having a structural skeleton of an olefin, such as ethylene or propylene, and one appropriately selected from known olefin-based resins may be used. In addition, the cationic olefin-based resin may be in an emulsion state in which the resin is dispersed in a solvent, such as water and/or an organic solvent. As the cationic olefin-based resin, a commercial product may be used, and for example, Arrowbase CB-1200 or CD-1200 (trade name, manufactured by Unitika Ltd.) may be mentioned.

As the cationic amine-based resin (cationic polymer), any compound having an amino group in its structure may be used, and one appropriately selected from known amino-based resins may be used. For example, a polyamine resin, a polyamide resin, or a polyallylamine resin may be mentioned. The polyamine resin is a resin having an amino group in its main skeleton. The polyamide resin is a resin having an amide group in its main skeleton. The polyallylamine resin is a resin having a structure derived from an allyl group in its mail skeleton.

As the cationic surfactant, for example, there may be mentioned a primary, secondary, or tertiary amine salt compound, an alkylamine salt, a dialkylamine salt, an aliphatic amine salt, a benzalkonium salt, or a quaternary ammonium salt.

The aggregating agent may be used alone, or at least two types thereof may be used in combination.

The aggregating agent contained in the first treatment liquid preferably has a solubility of 100 g or more with respect to 100 g of water at 20° C. Since having a relatively high water solubility, an aggregating agent having the solubility as described above can be preferably dissolved in the first treatment liquid even at a high concentration. As a result, the reactivity of the first treatment liquid can be increased, and more preferable image quality and abrasion resistance tend to be obtained. In addition, an aggregating agent having a high water solubility is liable to absorb moisture, and as a result, the abrasion resistance of a recorded matter may be degraded in some cases. However, according to the low-permeable substrate to which the first treatment liquid is applied, the abrasion resistance is not likely to be degraded by moisture absorption; hence, while the degradation of the abrasion resistance is suppressed, preferable image quality and abrasion resistance can be obtained.

The solubility described above is preferably 110 g or more and more preferably 120 g or more. Although not particularly limited, for example, an upper limit of the above solubility is preferably 400 g or less, more preferably 300 g or less, even more preferably 200 g or less, further preferably 150 g or less, and particularly preferably 140 g or less.

As the aggregating agent having a solubility of 100 g or more with respect to 100 g of water at 20° C., for example, there may be mentioned calcium nitrate tetrahydrate (129 [g/100 g of water], calcium chlorate (209 [g/100 g of water], calcium perchlorate (188 [g/100 g of water], calcium permanganate (338 [g/100 g of water], or calcium bromide (143 [g/100 g of water]. Among those mentioned above, calcium nitrate tetrahydrate and/or calcium bromide is preferable, and calcium nitrate tetrahydrate is more preferable.

1.2.2. Water

The first treatment liquid included in the ink set according to this embodiment is preferably a water-based composition containing at least water as a solvent component of the composition. A content of the water in a liquid medium component is preferably 30 to 100 percent by mass, more preferably 40 to 90 percent by mass, and further preferably 50 to 80 percent by mass. In addition, the liquid medium indicates a solvent component, such as water or an organic solvent.

A content of the water with respect to 100 percent by mass of the first treatment liquid is preferably 20 percent by mass or more, more preferably 30 to 99 percent by mass, even more preferably 40 to 90 percent by mass, and further preferably 50 to 80 percent by mass.

As the water, pure water, such as ion exchange water, ultrafiltration water, reverse osmosis water, or distilled water, or ultrapure water is preferably used. In particular, when water sterilized by ultraviolet radiation or addition of hydrogen peroxide is used as the water, the generation of fungi and bacteria can be preferably suppressed for a long time.

1.2.3. Organic Solvent

The first treatment liquid included in the ink set according to this embodiment may contain an organic solvent as a solvent component of the composition. A content of the organic solvent in the liquid medium component is preferably 5 to 50 percent by mass, more preferably 15 to 45 percent by mass, and further preferably 25 to 40 percent by mass. In addition, the liquid medium indicates a solvent component, such as water or an organic solvent.

A content of the organic solvent with respect to a total mass of the first treatment liquid is preferably 1 percent by mass or more, more preferably 5 percent by mass or more, even more preferably 10 percent by mass or more, further preferably 15 percent by mass or more, particularly preferably 20 percent by mass or more, and more particularly preferably 25 percent by mass or more. An upper limit of the content described above is preferably 60 percent by mass or less, more preferably 50 percent by mass or less, further preferably 40 percent by mass or less, and particularly preferably 35 percent by mass or less. In addition, the content of the organic solvent is also preferably set in the range described above with respect to a total mass of the liquid medium component contained in the first treatment liquid.

As the organic solvent, for example, an ester, an alkylene glycol ether, a cyclic ester, a nitrogen-containing solvent, an alcohol, or a polyvalent alcohol may be mentioned. As the nitrogen-containing solvent, for example, a cyclic amide or an acyclic amide may be mentioned. As the acyclic amide, for example, an alkoxyalkylamide may be mentioned.

As the ester, there may be mentioned a glycol monoacetate, such as ethylene glycol monomethyl ether acetate, ethylene glycol monoethyl ether acetate, or ethylene glycol monobutyl ether acetate; or a glycol diester, such as ethylene glycol diacetate or diethylene glycol diacetate.

As the alkylene glycol ether, a monoether or a diether of an alkylene glycol may be used, and an alkyl ether is preferable. As a concrete example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, or triethylene glycol monoethyl ether; or an alkylene glycol dialkyl ether, such as ethylene glycol dimethyl ether, ethylene glycol diethyl ether, ethylene glycol dibutyl ether, or diethylene glycol dimethyl ether.

As the cyclic ester, there may be mentioned a cyclic ester (lactone), such as β-propiolactone, γ-butyrolactone, δ-valerolactone, or ε-caprolactone, or a compound in which a hydrogen atom of a methylene group adjacent to the carbonyl group is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, or 3-methoxy-N,N-methylethylpropionamide.

As the cyclic amide, a lactam may be mentioned, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone. Those mentioned above are preferable since film formation of the resin is promoted, and in particular, 2-pyrrolidone is more preferable.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is 1 or more and is preferably 2 or more. The alkane may be either a linear type or a branched type. As the alcohol, for example, methanol, ethanol, n-propyl alcohol, or iso-propyl alcohol may be mentioned.

The polyvalent alcohol is a compound having at least two hydroxy groups in its molecule. As the polyvalent alcohol, for example, an alkanediol or a polyol may be mentioned.

As the alkanediol, for example, a compound in which two hydrogen atoms of an alkane are replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which hydroxy groups of at least two alkanediol molecules are intermolecular-condensed or a compound having at least three hydroxy groups may be mentioned.

As the condensate in which hydroxy groups of at least two alkanediol molecules are intermolecular-condensed, for example, there may be mentioned a dialkylene glycol, such as diethylene glycol or dipropylene glycol, or a trialkylene glycol, such as triethylene glycol or tripropylene glycol.

The compound having at least three hydroxy groups is a compound having an alkane or a polyether structural skeleton and at least three hydroxy groups. As the compound having at least three hydroxy groups, for example, there may be mentioned glycerin, trimethylolethane, trimethylolpropane, 1,2,5-hexanetriol, 1,2,6-hexanetriol, pentaerythritol, or a polyoxypropylene triol.

A content of the polyvalent alcohol with respect to the total mass of the first treatment liquid is preferably 1 to 65 percent by mass, more preferably 5 to 60 percent by mass, even more preferably 10 to 50 percent by mass, further preferably 15 to 50 percent by mass, and particularly preferably 20 to 40 percent by mass. A content of the alkanediol and/or the polyol may also be set in the range described above.

The organic solvents mentioned above may be used alone, or at least two types thereof may be used in combination.

1.2.4. Surfactant

The first treatment liquid included in the ink set according to this embodiment may contain a surfactant. The surfactant has a function to improve a wettability of the first treatment liquid to the recording medium by decreasing the surface tension thereof. Among the surfactants, for example, an acetylene glycol-based surfactant, a silicone-based surfactant, or a fluorine-based surfactant may be preferably used.

The acetylene glycol-based surfactant is not particularly limited, and for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

The silicone-based surfactant is not particularly limited, and a polysiloxane-based compound is preferably mentioned. Although the polysiloxane-based compound is not particularly limited, for example, a polyether modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG002, 005, 503A, or 008 (trade name, manufactured by Nisshin Chemical Industry Co., Ltd.).

As the fluorine-based surfactant, a fluorine modified polymer is preferably used, and as a concrete example, there may be mentioned BYK-3440 (trade name, manufactured by BYK Japan KK), Surflon S-241, S-242, or 5-243 (trade name, manufactured by AGC Seimi Chemical Co., Ltd.), or Ftergent 215M (trade name, manufactured by Neos Co., Ltd.).

The surfactants mentioned above may be used alone, or at least two types thereof may be used in combination.

When the surfactant is contained in the first treatment liquid, a content of the surfactant with respect to the total mass of the first treatment liquid is preferably 0.1 to 2 percent by mass, more preferably 0.4 to 1.5 percent by mass, and further preferably 0.5 to 1.0 percent by mass.

1.2.5. Amine

The first treatment liquid included in the ink set according to this embodiment may contain an amine. As the amine, an alkanolamine is preferable. As the alkanolamine, for example, ethanolamine, propanolamine, triethanolamine, diethanolamine, or triisopropanolamine may be mentioned. Those mentioned above each may also be used as a pH adjuster in some cases.

When the amine is contained in the first treatment liquid, a content of the amine with respect to the total mass of the first treatment liquid is preferably 0.01 to 1.00 percent by mass, more preferably 0.03 to 0.50 percent by mass, and further preferably 0.05 to 0.10 percent by mass.

1.2.6. Other Components

The first treatment liquid included in the ink set according to this embodiment may further contain, if needed, components, such as an urea, a saccharide, an antiseptic/fungicide agent, an antirust agent, a chelating agent, a viscosity adjuster, and/or an antioxidant.

1.3. Second Treatment Liquid

The second treatment liquid included in the ink set according to this embodiment contains an aggregating agent at a content of less than 0.60 mol/kg and is used for recording together with the ink composition on the recording medium which is an impermeable substrate.

In the recording on an impermeable substrate, when the reactivity between the ink and the treatment liquid is excessively high, the image quality, such as granularity, and the abrasion resistance may be degraded in some cases. Hence, in the second treatment liquid, the reactivity thereof with the ink composition is required to be controlled to the minimum necessary, that is, the content of the aggregating agent is controlled to be less than 0.60 mol/kg.

1.3.1. Aggregating Agent

The second treatment liquid included in the ink set according to this embodiment contains an aggregating agent.

A content of the aggregating agent in the second treatment liquid is less than 0.60 mol/kg, preferably less than 0.55 mol/kg, more preferably less than 0.50 mol/kg, further preferably less than 0.45 mol/kg, and particularly preferably less than 0.40 mol/kg. When the content of the aggregating agent is as described above, the abrasion resistance and the image quality, such as granularity, can be made excellent.

In addition, a lower limit of the content of the aggregating agent in the second treatment liquid is not particularly limited, and the lower limit described above is preferably 0.05 mol/kg or more, more preferably 0.10 mol/kg or more, even more preferably 0.15 mol/kg or more, further preferably 0.20 mol/kg or more, and particularly preferably mol/kg or more.

For example, the type of aggregating agent in the second treatment liquid may be made similar to that of the aggregating agent contained in the first treatment liquid described above.

The aggregating agent contained in the second treatment liquid preferably has a solubility of less than 100 g with respect to 100 g of water at 20° C. In a recorded matter including an impermeable substrate, the abrasion resistance may be degraded in some cases due to moisture absorption. However, since an aggregating agent having the solubility described above has a relatively low water solubility and is unlikely to absorb moisture, even in the recorded matter including an impermeable substrate, an excellent abrasion resistance tends to be maintained.

The solubility described above is preferably less than 80 g, more preferably less than 60 g, further preferably less than 40 g, and particularly preferably less than 20 g. Although a lower limit of the above solubility is not particularly limited, for example, the lower limit described above is preferably 5 g or more and more preferably 10 g or more.

As the aggregating agent having a solubility of less than 100 g with respect to 100 g of water at 20° C., for example, there may be mentioned calcium formate (16.6 [g/100 g of water]), calcium nitrite (84.5 [g/100 g of water]), calcium chloride (74.5 [g/100 g of water]), calcium acetate (34.7 [g/100 g of water]), calcium cyanide (45 [g/100 g of water]), L-calcium lactate pentahydrate (5 [g/100 g of water]), calcium propionate (10 [g/100 g of water]), calcium ascorbate dihydrate (50 [g/100 g of water]), or calcium iodide (66 [g/100 g of water]). Among those mentioned above, calcium formate and/or calcium propionate is preferable, and calcium formate is more preferable.

1.3.2. Other Components

In the second treatment liquid included in the ink set according to this embodiment, components other than the aggregating agent may be made similar to the other components in the first treatment liquid. That is, the second treatment liquid may contain water, an organic solvent, a surfactant, and an amine, and the types and the contents thereof may be made similar to those in the first treatment liquid. Furthermore, if needed, components, such as an urea, a saccharide, an antiseptic/fungicide agent, an antirust agent, a chelating agent, a viscosity adjuster, and/or an antioxidant, may also be contained.

When the amine is contained in the second treatment liquid, a content of the amine with respect to a total mass of the second treatment liquid is preferably 0.001 to 0.100 percent by mass, more preferably 0.001 to 0.030 percent by mass, and further preferably 0.001 to 0.010 percent by mass.

1.4. Ink Composition

The water-based ink composition included in the ink set according to this embodiment contains a colorant.

The "water-based" composition in the present disclosure indicates a composition containing at least water as a primary liquid medium component contained in the composition.

A content of the water in the liquid medium component contained in the composition is 20 percent by mass or more, preferably 30 to 100 percent by mass, more preferably 35 to 98 percent by mass, further preferably 40 to 90 percent by mass, and particularly preferably 50 to 80 percent by mass. In addition, the liquid medium indicates a solvent component, such as water or an organic solvent. The content of the water with respect to a total mass of the composition may be set in the range (less than 100 percent by mass) described above.

1.4.1. Colorant

As the colorant, both a dye and a pigment may be used. Since having a discoloration resistance against light, gas, and the like, the pigment is preferably used. An image formed on a recording medium using a pigment has an excellent image quality, and in addition, for example, a water resistance, a gas resistance, and a light resistance are also made excellent; hence, the image described above has a preferable storage stability. In particular, the characteristics described above are significant when an image is formed on the recording medium which is a low-permeable substrate or an impermeable substrate.

The pigment is not particularly limited, and for example, an inorganic pigment or an organic pigment may be mentioned. As the inorganic pigment, besides a titanium oxide and an iron oxide, a carbon black formed by a known method, such as a contact method, a furnace method, or a thermal method, may be used. On the other hand, as the organic pigment, for example, an azo pigment, a polycyclic pigment, a nitro pigment, a nitroso pigment, or an aniline black may be used. As the azo pigment, for example, an azo lake, an insoluble azo pigment, a condensed azo pigment, or a chelate azo pigment may be mentioned. As the polycyclic pigment, for example, a phthalocyanine pigment, a perylene pigment, a perinone pigment, an anthraquinone pigment, or a quinophralone pigment may be mentioned.

As a pigment used for a black ink, for example, a carbon black may be mentioned. The carbon black is not particularly limited, and for example, a furnace black, a lamp black, an acetylene black, or a channel black (C.I. Pigment Black 7) may be mentioned, and in addition, as a commercial product thereof, for example, there may be mentioned No. 2300, 900, MCF88, No. 20B, No. 33, No. 40, No. 45, No. 52, MA7, MA8, MA77, MA100, or No. 2200B (trade name, manufactured by Mitsubishi Chemical Corporation); Carbon Black FW1, FW2, FW2V, FW18, FW200, S150, S160, or S170, Pretex 35, U, V, or 140U, or Special Black 6, 5, 4A, 4, or 250 (trade name, manufactured by Degussa); Conductex SC, or Raven 1255, 5750, 5250, 5000, 3500, 1255, or 700 (trade name, manufactured by Columbia Carbon); or Regal 400R, 330R, or 660R, Mogul L, Monarch 700, 800, 880, 900, 1000, 1100, 1300, or 1400, or Elftex 12 (trade name, manufactured by Cabot Japan Corporation).

A pigment used for a white ink is not particularly limited, and for example, there may be mentioned a white inorganic pigment, such as C.I. Pigment White 6, 18, or 21, titanium oxide, zinc oxide, zinc sulfide, antimony oxide, magnesium oxide, or zirconium oxide. Besides the white inorganic pigments mentioned above, a white organic pigment, such as white hollow resin fine particles or white high molecular weight particles, may also be used.

A pigment used for a yellow ink is not particularly limited, and for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

A pigment used for a magenta ink is not particularly limited, and for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

A pigment used for a cyan ink is not particularly limited, and for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

In addition, a pigment used for a color ink other than a magenta, a cyan, and a yellow ink is not particularly limited, and for example, there may be mentioned C.I. pigment Green 7 or 10, C.I. pigment Brown 3, 5, 25, or 26, or C.I. pigment Orange 1, 2, 5, 7, 13, 14, 15, 16, 24, 34, 36, 38, 40, 43, or 63.

A pearl pigment is not particularly limited, and for example, a pigment, such as a titanium dioxide coated mica, a fish scale flake, or bismuth oxychloride, having pearl luster or interference luster may be mentioned.

A metallic pigment is not particularly limited, and for example, there may be mentioned particles formed from a single element, such as aluminum, silver, gold, platinum, nickel, chromium, tin, zinc, indium, titanium, or copper, or particles formed from an alloy containing at least one of the elements mentioned above.

When the pigment is used as the colorant, the pigment is preferably configured so as to be stably dispersed and maintained in water. As a method therefor, for example, there may be mentioned a method in which the pigment is dispersed with a resin dispersant, such as a water-soluble resin and/or a water dispersible resin (hereinafter, the pigment treated by this method is referred to as "resin disperse pigment" in some cases); a method in which the pigment is dispersed with a dispersant (hereinafter, the pigment treated by this method is referred to as "dispersant disperse pigment" in some cases); or a method in which a hydrophilic functional group is introduced chemically and/or physically on surfaces of pigment particles, and the pigment is then dispersed and/or dissolved in water without using the resin or the dispersant described above ((hereinafter, the pigment treated by this method is referred to as "surface-treated pigment" in some cases).

The ink composition may be able to use any one of the resin disperse pigment, the dispersant disperse pigment, and the surface-treated pigment, and if needed, although at least two thereof may be used in combination by mixing, the resin disperse pigment is preferably contained.

As the resin dispersant used for the resin disperse pigment, for example, there may be mentioned a poly(vinyl alcohol), a poly(acrylic acid), an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, or a salt of at least one of those mentioned above. Among those mentioned above, a copolymer formed between a monomer having a hydrophobic functional group and a monomer having a hydrophilic functional group or a polymer formed from a monomer having both a hydrophobic functional group and a hydrophilic functional group is preferable. As the structure of the copolymer, any one of a random copolymer, a block copolymer, an alternate copolymer, and a graft copolymer may be used.

Although a content rate of the resin dispersant may be appropriately selected in accordance with a pigment to be dispersed, the content rate described above with respect to 100 parts by mass of the pigment in the ink is preferably 5 to 200 parts by mass and more preferably 30 to 120 parts by mass.

As the dye, an acidic dye is preferable. As the acidic dye, for example, there may be mentioned an azo base, an anthraquinone base, a pyrazolone base, a phthalocyanine base, a xanthene base, an indigoid base, or a triphenylmethane base. As a concrete example of the acidic dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, or C.I. Acid Black 1, 2, 24, or 94. The dye may be used alone, or at least two types thereof may be used in combination.

A lower limit of the content of the colorant contained in the ink composition with respect to a total mass of the ink composition is preferably 0.5 percent by mass or more, more preferably 1 percent by mass or more, and further preferably 3 percent by mass or more. On the other hand, an upper limit of the content of the colorant contained in the ink composition with respect to the total mass of the ink composition is preferably 10 percent by mass or less, more preferably 7 percent by mass or less, and further preferably 6 percent by mass or less. Since the content of the colorant is in the range described above, the image formed on the recording medium is excellent in water resistance, gas resistance, light resistance, and the like and also has a preferable ink storage stability.

1.4.2. Resin Particles

The water-based ink composition included in the ink set according to this embodiment may contain resin particles. One function of the resin particle is to improve the abrasion resistance and the like of the image formed by the ink composition adhered to the recording medium. As the resin of the resin particle, for example, there may be mentioned resin particles formed from an urethane-based resin, an acrylic-based resin (including a styrene acrylic-based resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Among those mentioned above, an urethane-based resin, an acrylic-based resin, a polyolefin-based resin, or a polyester-based resin is preferable. Although those resin particles mentioned above are frequently used in the form of emulsion, the resin particles may also be supplied in the form of powder. In addition, one type of resin particles may be used alone, or at least two types thereof may be used in combination.

The urethane-based resin is a generic name of resins having an urethane bond. As the urethane-based resin, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. In addition, as the urethane-based resin, a commercial product may also be used, and for example, Superflex 460, 460s, 840, or E-4000 (trade name, manufactured by DKS Co., Ltd.); Resamine D-1060, D-2020, D-4080, D-4200, D-6300, or D-6455 (trade name, manufactured by Dainichiseika Color & Chemicals Mfg. Co., Ltd.); Takelac WS-6021 or W-512-A-6 (trade name, manufactured by Mitsui Chemicals & Polyurethanes, Inc.); Suncure 2710 (trade name, manufactured by LUBRIZOL); or Permarine UA-150 (trade name, manufactured by Sanyo Chemical Industries, Ltd.) may be used.

The acrylic-based resin is a generic name of polymers each obtained by polymerizing at least one acrylic-based monomer, such as (meth)acrylic acid or a (meth)acrylate ester, as one component, and for example, a resin obtained from an acrylic-based monomer or a copolymer obtained by copolymerization between an acrylic-based monomer and another monomer may be mentioned. For example, an acryl vinyl-based resin which is a copolymer between an acrylic-based monomer and a vinyl-based monomer may be mentioned. In addition, for example, as the vinyl-based monomer, styrene may be mentioned.

As the acrylic-based monomer, for example, acrylamide or acrylonitrile may also be used. As a resin emulsion formed using an acrylic-based resin as a raw material, a commercial product may also be used, and for example, at least one selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation) may also be used.

In addition, in this specification, the acrylic-based resin may include a styrene-acrylic-based resin which will be described later. In addition, in this specification, (meth)acryl indicates acryl and/or methacryl. The styrene-acrylic-based resin is a copolymer obtained from a styrene monomer and a (meth)acrylic-based monomer, and for example, there may be mentioned a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer. As the styrene-acrylic-based resin, a commercial product may also be used, and for example, there may be mentioned Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A or 975N (trade name, manufactured by Nippon Synthetic Chemical Industry Co., Ltd.); or Vinyblan 2586 (Nisshin Chemical Industry Co., Ltd.).

The polyolefin-based resin is a resin having a structural skeleton of an olefin, such as ethylene, propylene, or butylene, and one appropriately selected from known polyolefin-based resins may be used. As the polyolefin-based resin, a commercial product may also be used, and for example, Arrowbase CB-1200 or CD-1200 (trade name, manufactured by Unitika Ltd.) may be used.

A volume average particle diameter (D50) of the resin particles is preferably 10 to 300 nm, more preferably 30 to 300 nm, further preferably 30 to 250 nm, and particularly preferably 40 to 220 nm.

In addition, the volume average particle diameter (D50) can be measured by a particle size distribution measurement device. As the particle size distribution measurement device, for example, a particle size distribution meter (such as "Nanotrac Series" manufactured by MicrtotracBEL Corp.) using a dynamic light scattering method as a measurement principle may be mentioned. The volume average particle diameter is represented by the D50 value.

When the resin particles are contained in the ink composition, a content of the resin particles with respect to the total mass of the ink composition is, as a solid content, 0.1 to 20 percent by mass, preferably 0.5 to 10 percent by mass, and more preferably 1 to 5 percent by mass.

1.4.3. Wax

The ink composition included in the ink set according to this embodiment may further contain a wax. The wax is not particularly limited, and for example, there may be mentioned a vegetable/animal-based wax, such as a carnauba wax, a candelilla wax, a beedswax, a rice wax, or a lanolin; a mineral-based wax, such as a montan wax or an ozokerite; a so-called petroleum-based wax such as a paraffin wax; a synthetic wax, such as a carbon wax, a Hoechst wax, a polyolefin wax, a silicone wax, or a stearic acid amide; a natural/synthetic wax emulsion, such as an α-olefin/maleic anhydride copolymer; or a compound wax.

Among those mentioned above, for example, a silicone wax, a polyolefin wax, or a paraffin wax is preferable, and a polyolefin wax is more preferable. Since the wax as described above is used, the abrasion resistance tends to be further improved.

As the wax, a commercial product may also be used, and for example, as a commercial product of a polyolefin wax, there may be mentioned Hitec Series, such as Hitec E-7025P, Hitec E-2213, Hitec E-6500, Hitec E-6314, Hitec E-9460, Hitec E-9015, Hitec E-4A, Hitec E-5403P, or Hitec E-8237 (trade name, polyethylene-based wax, manufactured by Toho Chemical Industry Co., Ltd.).

A content of the wax with respect to the total mass of the ink composition is preferably 0.1 to 1.2 percent by mass, more preferably 0.2 to 1.0 percent by mass, and further preferably 0.3 to 0.7 percent by mass. Since the content of the wax is in the range described above, the abrasion resistance tends to be further improved.

1.4.4. Other Components

In the ink composition included in the ink set according to this embodiment, components other than those described above may be made similar to those in the first treatment liquid. That is, the ink composition may also contain water, an organic solvent, a surfactant, and an amine, and the types and the contents thereof may be made similar to those of the first treatment liquid. Furthermore, if needed, components, such as an urea, a saccharide, an antiseptic/fungicide agent, an antirust agent, a chelating agent, a viscosity adjuster, and/or an antioxidant, may also be contained.

In addition, when the organic solvent is contained in the ink composition, a content of the organic solvent in the liquid medium component is preferably 1 to 40 percent by mass, more preferably 5 to 30 percent by mass, and further preferably 10 to 25 percent by mass. In addition, the liquid medium indicates a solvent component, such as water or an organic solvent.

A content of the organic solvent with respect to the total mass of the ink composition is preferably 1 percent by mass or more, more preferably 5 percent by mass or more, and further preferably 10 percent by mass or more. An upper limit of the content described above is preferably percent by mass or less, more preferably 30 percent by mass or less, and further preferably 25 percent by mass or less. In addition, the content of the organic solvent with respect to a total mass of the liquid medium component contained in the ink composition is also preferably set in the range described above.

1.5. White Ink Composition

In the ink set according to this embodiment, the ink composition described above is a non-white ink composition, and the ink set described above may further include a white ink composition. Even in the structure as described above, in both the recorded matter including a low-permeable substrate and the recorded matter including an impermeable substrate, excellent image quality (burying property and granularity) and abrasion resistance tend to be obtained.

In addition, in the structure as described above, the second treatment liquid is preferably used together with the white ink composition for recording on the recording medium which is an impermeable substrate.

The "white ink composition" indicates an ink composition containing a white colorant.

The "non-white ink composition" indicates an ink composition containing a non-white colorant. The non-white colorant indicates a colorant other than a white colorant. As the non-white colorant, for example, a color colorant, such as a cyan, a yellow, a magenta, or a black colorant, is preferably used.

In addition, in this specification, the word "white" to be used for the white ink composition, the white colorant, or the like not only indicates a perfect white color but also includes a chromatic, an achromatic, and a glossy color as long as each of which is visually recognized as a white color. In addition, an ink and/or a pigment called or sold by a name which implies a white ink and/or a white pigment may also be considered to have a white color.

In more quantitatively, the "white color" not only indicates a color at an L* of 100 in CIELAB but also includes a color which has an L* of 60 to 100, an a* of ±10 or less, and a b* of ±10 or less. In addition, the word "non-white" to be used for the non-white ink composition, the non-white colorant, or the like in this specification indicates a color other than the "white color" described above.

1.5.1. White Colorant

The white ink composition contains a white colorant. For example, a white pigment may be mentioned, and as the white pigment, for example, a metal oxide or a metal compound, such as barium sulfate or calcium carbonate, may be mentioned. As the metal oxide, for example, titanium dioxide, zinc oxide, silica, alumina, or magnesium oxide may be mentioned. In addition, as the white pigment, particles having a hollow structure may also be used, and as the particles having a hollow structure, known particles may be used.

As a typical example of the white pigment, titanium dioxide may be mentioned, and for example, there may be mentioned Tipaque CR-50-2, CR-57, CR-58-2, CR-60-2, CR-60-3, CR-Super-70, CR-90-2, CR-95, CR953, PC-3, PF-690, PF-691, PF-699, PF-711, PF-728, PF-736, PF-737, PF-739, PF-740, PF-742, R-980, or UT-771 (trade name, manufactured by Ishihara Sangyo Kaisha, Ltd.).

As the white pigment, among those mentioned above by way of example, since having preferable white degree and abrasion resistance, titanium dioxide is preferably used. The white pigment may be used alone, or at least two types thereof may be used in combination.

The white pigment is preferably stably dispersed and maintained in a solvent. In the white ink composition, as is the case of the ink composition described above, any of the resin disperse pigment, the dispersant disperse pigment, and the surface-treated pigment described above may be used, and if needed, at least two thereof may be used in combination by mixing; however, the resin disperse pigment described above is preferably contained.

A volume average particle diameter (D50) of the white pigment is preferably 30.0 to 600.0 nm, more preferably 100.0 to 500.0 nm, and further preferably 150.0 to 400.0 nm. When the volume average particle diameter of the white pigment is in the range described above, the particles are not likely to precipitate, and hence, the dispersion stability can be made preferable. In addition, when the white pigment as described above is used for an ink jet recording apparatus, for example, clogging of nozzles may be made unlikely to occur. In addition, when the volume average particle diameter of the white pigment is in the range described above, a background concealing property and an image visibility tend to be further improved.

A content (solid content) of the white colorant in the white ink composition with respect to a total mass of the white ink composition is preferably 0.5 to 20.0 percent by mass, more preferably 1.0 to 20.0 percent by mass, and further preferably 3.0 to 15.0 percent by mass. When the content described above is in the range described above, an image having a sufficient visibility tends to be obtained.

1.5.2. Chelating Agent

The white ink composition may contain a chelating agent. A concrete chelating agent is not particularly limited, and for example, there may be mentioned ethylenediaminetetraacetic acid (EDTA), N-(2-hydroxyethyl)ethylenediaminetriacetic acid, ethylenediaminesuccinic acid, imino-disulfosuccinic acid, dicarboxymethyl glutamic acid, bis(2-aminoethyl)ethylene glycol tetraacetic acid, bis(2-aminophenyl)ethylene glycol tetraacetic acid, bis(2-hydroxyethyl)glycine, 1,2-diaminocyclohexane tetraacetic acid, diethylenetriamine pentaacetic acid, iminodiacetic acid, N-(2-hydroxyethyl)iminodiacetic acid, nitrilotriacetic acid, nitrilotrimethyl phosphoric acid, triethylenetetramine hexaacetic acid, or tetrakis(2-pyridylmethyl)ethylenediamine.

A content of the chelating agent in the white ink composition with respect to the total mass of the white ink composition is preferably 0.001 to 0.100 percent by mass, more preferably 0.003 to 0.050 percent by mass, and further preferably 0.005 to 0.030 percent by mass.

1.5.3. Other Components

In the white ink composition, components other than those described above may be made similar to those of the ink composition described above. That is, the white ink composition may contain water, an organic solvent, a surfactant, resin particles, a wax, and an amine, and the types and the contents thereof may be made similar to those of the ink composition described above. In addition, if needed, components, such as an urea, a saccharide, an antiseptic/fungicide agent, an antirust agent, a viscosity adjuster, and/or an antioxidant, may also be contained.

In addition, a content of the resin particles in the white ink composition with respect to the total mass of the white ink composition is, as a solid content, preferably 1 to 30 percent by mass, more preferably 2 to 20 percent by mass, and further preferably 3 to 10 percent by mass. When the content of the resin particles is in the range described above, a white image having a sufficient abrasion resistance tends to be formed.

In addition, a content of the wax with respect to the total mass of the white ink composition is, as a solid content, preferably 0.1 to 1.2 percent by mass, more preferably 0.2 to 1.0 percent by mass, and further preferably 0.3 to 0.7 percent by mass. Since the content of the wax is in the range described above, the abrasion resistance tends to be further improved.

1.6. Clear Ink Composition

The ink set according to this embodiment may be an ink set including a clear ink composition which contains a resin and which is an ink other than the ink composition and the white ink composition described above.

In addition, in the case described above, the first treatment liquid may be used together with the clear ink composition for recording on the recording medium which is a low-permeable substrate. In addition, the second treatment liquid may be used together with the clear ink composition for recording on the recording medium which is an impermeable substrate.

In addition, the "clear ink composition" is not an ink to be used for coloration of a recording medium and is an ink to be used for at least one of other purposes. Although including an improvement in characteristics, such as abrasion resistance, of a recorded matter, an adjustment of glossiness of a recording medium, an improvement in fixability and color development property of a color ink, and the like, the other purposes are not limited thereto. In addition, the clear ink composition is not a treatment liquid and contains no aggregating agents.

In addition, although the clear ink composition may or may not contain the colorant described above, a content of the colorant in the clear ink composition is preferably 0.2 percent by mass or less, more preferably 0.1 percent by mass or less, and further preferably 0.05 percent by mass or less, and a lower limit of the content described above may also be 0 percent by mass.

1.6.1. Resin

The clear ink composition contains a resin. As the resin, for example, a resin in the form of emulsion in which a polymer component is dispersed or dissolved in a solvent may be used. In particular, a resin dispersed or dissolved in the form of emulsion is preferable, and a dispersed resin (resin particles) is particularly preferable. The resin particles can be made similar to those of the ink composition described above.

A content of the resin particles in the clear ink composition with respect to a total mass of the clear ink composition is, as a solid content, preferably 1 to 40 percent by mass, more preferably 3 to 30 percent by mass, further preferably 5 to 20 percent by mass, and particularly preferably 7 to 15 percent by mass. Since the content of the resin particles is in the range described above, the abrasion resistance tends to be further improved.

1.6.2. Other Components

In the clear ink composition, components other than those described above may be made similar to those of the ink composition described above. That is, the clear ink composition may contain water, an organic solvent, a surfactant, a wax, and an amine, and the types and the contents of those components may be made similar to those of the ink composition described above. Furthermore, if needed, components, such as an urea, a saccharide, an antiseptic/fungicide agent, an antirust agent, a chelating agent, a viscosity adjuster, and an antioxidant, may also be contained.

In addition, a content of the wax in the clear ink composition with respect to the total mass of the clear ink composition is, as a solid content, preferably 0.3 to 3.5 percent by mass, more preferably 0.5 to 3.0 percent by mass, and further preferably 1.0 to 2.5 percent by mass. Since the content of the wax is in the range described above, the abrasion resistance tends to be further improved.

2. Recording Apparatus

A recording apparatus according to one embodiment of the present disclosure is a recording apparatus which performs recording on a recording medium and which includes the ink set described above, and the recording described above includes a first recording to perform recording on a recording medium which is a low-permeable substrate using the ink composition and the first treatment liquid described above and a second recording to perform recording on a recording medium which is an impermeable substrate using the ink composition and the second treatment liquid described above.

According to the recording apparatus of this embodiment, the ink set described above is included, and in accordance with the recording medium, the recording can be performed by selecting the treatment liquid to be used. As a result, in both a recorded matter including a low-permeable substrate and a recorded matter including an impermeable substrate, excellent image quality (burying property and granularity) and abrasion resistance can be obtained.

The recording medium which is a low-permeable substrate and the recording medium which is an impermeable substrate on each of which the recording is performed by the recording apparatus according to this embodiment may have the same structures as those described above.

In addition, in the following example, although the case in which the ink composition and the treatment liquid included in the ink set are ejected from nozzles of an ink jet head and then adhered to the recording medium will be described, a method to adhere a liquid is not limited to an ink jet method and may be a spray coating method or the like.

Figure 2:
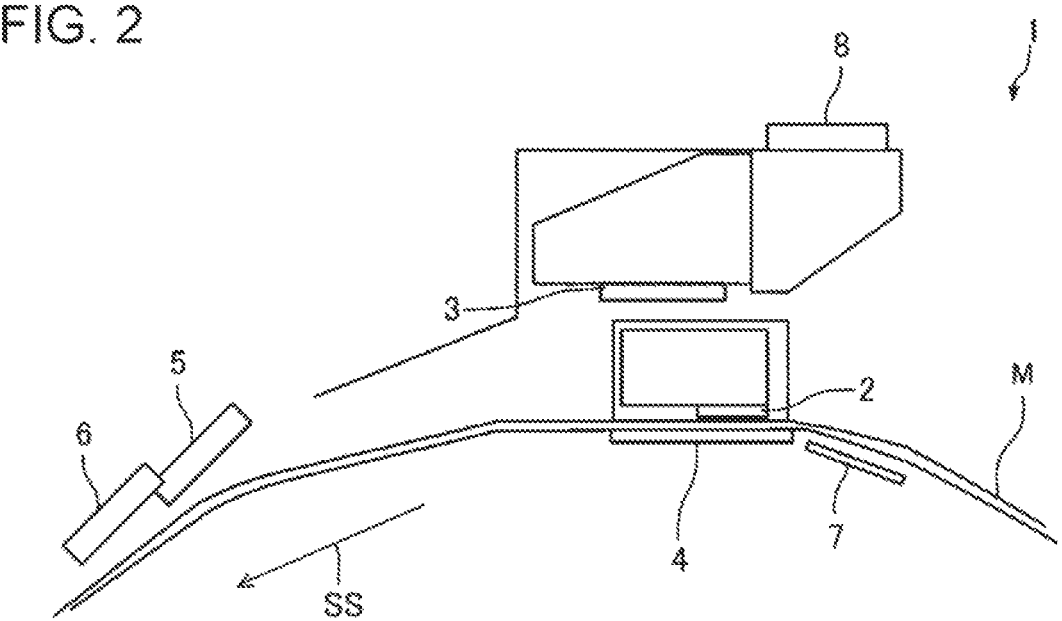
FIG. 2 is a schematic view showing one example of an ink jet recording apparatus according to an embodiment.

FIG. 2 is a schematic cross-sectional view showing the recording apparatus according to this embodiment. According to an ink jet recording apparatus 1 as described above, the ink set described above is included, and the first recording and the second recording described above can be performed.

Figure 3:
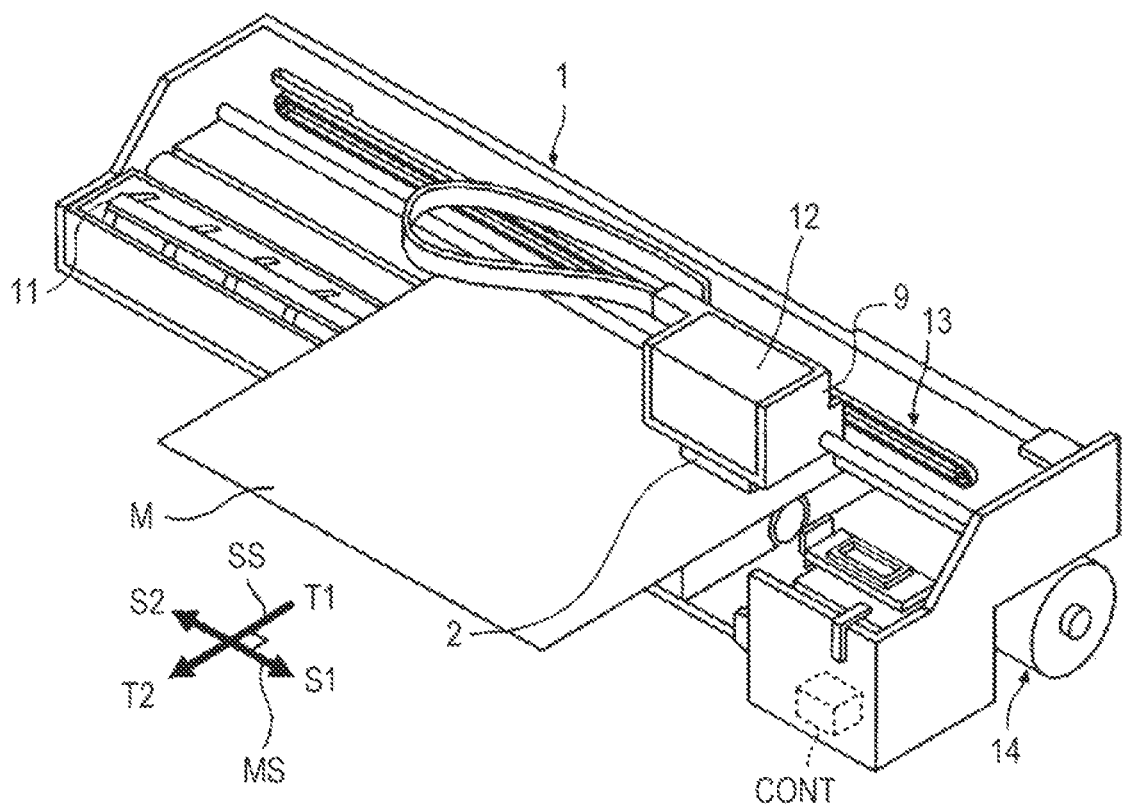
FIG. 3 is a schematic view showing a carriage and its vicinity of one example of the ink jet recording apparatus according to the embodiment.

FIG. 3 is a perspective view showing one example of the structure of a carriage and its vicinity of the ink jet recording apparatus 1 shown in FIG. 2. As shown in FIGS. 2 and 3, the ink jet recording apparatus 1 includes an ink jet head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, all operations thereof are controlled by the control portion CONT shown in FIG. 3.

The ink jet head 2 has a structure to perform recording on a recording medium M by ejecting the ink composition and the treatment liquid included in the ink set from nozzles of the ink jet head 2 so as to be adhered thereto. In addition, hereinafter, when the "composition" is simply described, the composition indicates at least one of the first treatment liquid, the second treatment liquid, the ink composition, and, if needed, the other compositions described above.

In the example shown in FIG. 3, the ink jet head 2 is a serial type ink jet head and is configured to adhere the treatment liquid and the ink composition to the recording medium M by at least one scanning performed in a main scanning direction relative to the recording medium M. The ink jet head 2 is mounted on the carriage 9 shown in FIG. 3. The ink jet head 2 is scanned at least one time in the main scanning direction relative to the recording medium M by the operation of the carriage transfer mechanism 13 to transfer the carriage 9 in a medium width direction of the recording medium M. The medium width direction is the main scanning direction of the ink jet head 2. The scanning in the main scanning direction is also called a main scanning.

In addition, the main scanning direction is a direction in which the carriage 9 mounting the ink jet head 2 is transferred. In FIG. 2, the main scanning direction is a direction intersecting a sub-scanning direction which is a transport direction of the recording medium M shown by an arrow SS. In FIG. 3, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the ink jet head 2 and the sub-scanning which is the transport of the recording medium M are each performed at least one time, the recording is performed on the recording medium M. That is, a step (treatment liquid adhesion step) to adhere the treatment liquid to the recording medium and a step (ink adhesion step) to adhere the ink composition to the recording medium are performed by at least one main scanning in which the ink jet head 2 is transferred in the main scanning direction and by at least one sub-scanning in which the recording medium M is transported in the sub-scanning direction intersecting the main scanning direction.

A cartridge 12 to supply the treatment liquid and the ink composition to the ink jet head 2 includes a plurality of independent cartridges. The cartridge 12 is detachably fitted to the carriage 9 mounting the ink jet head 2. In the respective cartridges, different types of treatment liquids, different types of ink compositions, and if needed, the other compositions are filled, and the compositions are supplied to respective nozzles from the cartridge 12. In addition, although the case in which the cartridge 12 is fitted to the carriage 9 is shown by way of example, the cartridge 12 is not limited thereto and may be provided at a position other than that of the carriage 9 so that the compositions are each supplied to the nozzle by a supply tube not shown.

In the recording apparatus according to this embodiment, in accordance with the type of recording medium used for recording, the type of treatment liquid used for recording is selected. That is, when the recording is performed on the recording medium which is a low-permeable substrate, the first treatment liquid filled in the cartridge 12 is selected, and the first recording is performed. When the recording is performed on the recording medium which is an impermeable substrate, the second treatment liquid filled in the cartridge 12 is selected, and the second recording is performed.

By the recording apparatus according to this embodiment, in the first recording and the second recording, the treatment liquid may be adhered to the recording medium by an ink jet method; in the first recording, the treatment liquid in a first liquid droplet mass may be ejected and adhered to the recording medium; and in the second recording, the treatment liquid in a second liquid droplet mass smaller than the first liquid droplet mass may be ejected and adhered to the recording medium. When the recording is performed as described above, in both the recorded matter including a low-permeable substrate and the recorded matter including an impermeable substrate, more excellent image quality and abrasion resistance tend to be obtained.

In addition, the "liquid droplet mass" indicates a mass of one liquid droplet ejected from the nozzle of the ink jet head 2.

The first liquid droplet mass is preferably 8 ng or less, more preferably 7 ng or less, further preferably 6 ng or less, and particularly preferably 5 ng or less. A lower limit of the first liquid droplet mass is preferably more than 3 ng and more preferably more than 4 ng.

The second liquid droplet mass is preferably 6 ng or less, more preferably 5 ng or less, further preferably 4 ng or less, and particularly preferably 3 ng or less. A lower limit of the second liquid droplet mass is preferably more than 1 ng and more preferably more than 2 ng.

The second liquid droplet mass is smaller than the first liquid droplet mass preferably by 0.5 ng or more, more preferably by 1.0 ng or more, even more preferably by 1.5 ng or more, and further preferably by 2.0 ng or more. In addition, the second liquid droplet mass is smaller than the first liquid droplet mass preferably by 10 ng or less and more preferably by 5 ng or less.

In addition, when the white ink composition is adhered to the recording medium by an ink jet method, a liquid droplet mass of the white ink composition is preferably 16 ng or less, more preferably 14 ng or less, further preferably 12 ng or less, and particularly preferably 10 ng or less. A lower limit of the liquid droplet mass described above is preferably more than 6 ng and more preferably more than 8 ng.

In addition, when the clear ink composition is adhered to the recording medium by an ink jet method, a liquid droplet mass of the clear ink composition is preferably 8 ng or less, more preferably 7 ng or less, further preferably 6 ng or less, and particularly preferably 5 ng or less. A lower limit of the liquid droplet mass described above is preferably more than 3 ng and more preferably more than 4 ng.

For the ejection of the composition by the ink jet head 2, a known method may be used. In this embodiment, a method to eject liquid droplets using vibration of a piezoelectric element, that is, an ejection method to form ink droplets by mechanical deformation of an electrostrictive element, is used.

In order to dry the recording medium M when the composition is ejected from the ink jet head 2 and then adhered to the recording medium M, the ink jet recording apparatus 1 may include a heating mechanism to perform a primary drying step. The heating mechanism may use a conduction method, a ventilation method, a radiation method, or the like. The conduction method is a method to conduct heat to the recording medium M from a member in contact therewith. For example, the platen heater 4 may be mentioned. The ventilation method is a method to dry the composition by sending an ordinary temperature wind or a hot wind to the recording medium M. For example, the ventilation fan 8 may be mentioned. The radiation method is a method to heat the recording medium M by emitting radioactive rays which generates heat to the recording medium M. For example, the IR heater 3 may be mentioned. Those heating mechanisms may be used alone, or at least two types thereof may be used in combination.

For example, in the ink jet recording apparatus 1, as the heating mechanism, the IR heater 3 and the platen heater 4 are included. When the recording medium M is dried by the primary drying step, for example, the IR heater 3, the platen heater 4, and/or the ventilation fan 8 may be used.

In addition, when the IR heater 3 is used, the recording medium M can be heated using a radiation method to radiate infrared rays from an ink jet head 2 side. Accordingly, although the ink jet head 2 is also liable to be simultaneously heated, compared to the case in which heating is performed from a rear surface of the recording medium M by the platen heater 4 or the like, the temperature can be increased without receiving the influence of the thickness of the recording medium M. In addition, there may also be provided various types of fans (such as the ventilation fan 8 shown in the figure) to dry the composition on the recording medium M by supplying a hot wind or a wind having the same temperature as that in the environment to the recording medium M.

In order to perform the drying at an early stage after the composition ejected from the ink jet head 2 is adhered to the recording medium M, the platen heater 4 is configured to be able to heat the recording medium M at a position facing the ink jet head 2 with the platen 11 interposed therebetween. The platen heater 4 may be disposed downstream or upstream of the recording medium M in the transport direction with respect to the ink jet head 2. In the case as described above, the heating of the ink jet head 2 by the platen heater 4 is suppressed, the drying of the liquid in the nozzle is suppressed, and hence, for example, clogging may be suppressed in some cases. The platen heater 4 is able to heat the recording medium M by a conduction method and is used if needed in a recording method, and when the platen heater 4 is used, a surface temperature of the recording medium M is controlled preferably at 45.0° C. or less and more preferably at 40.0° C. or less. In a line type ink jet recording apparatus, the platen heater 4 corresponds to an under heater. When the primary drying step using the heating mechanism is not performed, the heating mechanism may not be provided, and in the recording apparatus according to this embodiment, the heating mechanism is preferably not provided.

In addition, in the ink adhesion step, an upper limit of the surface temperature of the recording medium M is preferably 45.0° C. or less, more preferably 40.0° C. or less, further preferably 38.0° C. or less, and particularly preferably 35.0° C. or less. In addition, a lower limit of the surface temperature of the recording medium M is preferably 25.0° C. or more, more preferably 28.0° C. or more, further preferably 30.0° C. or more, and particularly preferably 32.0° C. or more.

In addition, in the recording method which will be described below, after the ink adhesion step, a post heating step in which the recording medium M is heated to dry and fix the composition may be included. The post heating step is also called a secondary heating step.

The heating heater 5 used for the post heating step is a secondary heating heater or a secondary drying heater to dry and fix the composition adhered to the recording medium M. The heating heater 5 can be used in the post heating step. Since the heating heater 5 heats the recording medium M on which an image is formed, for example, moisture contained in the composition is more rapidly evaporated and scattered, and when the resin is contained in the composition, an ink film is formed from the resin. As described above, since the film of the composition is tightly fixed or adhered onto the recording medium M, a film forming property is made excellent, and an excellent high quality image can be obtained in a short time.

An upper limit of the surface temperature of the recording medium M by the heating heater 5 is preferably 120.0° C. or less, more preferably 100.0° C. or less, further preferably 90.0° C. or less, and particularly preferably 80.0° C. or less. In addition, a lower limit of the surface temperature of the recording medium M is preferably 60.0° C. or more and more preferably 70.0° C. or more. Since the surface temperature described above is in the range described above, a high quality image can be obtained in a short time. In addition, in the line type ink jet recording apparatus, the heating heater 5 corresponds to an after heater and is formed of a carbon heater or the like.

The ink jet recording apparatus 1 may include the cooling fan 6. After the composition adhered to the recording medium M is dried, since the composition on the recording medium M is cooled by the cooling fan 6, the coating film can be formed with good adhesion on the recording medium M.

In addition, the ink jet recording apparatus 1 may include the pre-heater 7 to heat the recording medium M in advance before the composition is adhered to the recording medium M. In addition, in the line type ink jet recording apparatus, as the heating mechanism, the pre-heater 7 may be provided.

Under the carriage 9, the platen 11 to support the recording medium M, the carriage transfer mechanism 13 to transfer the carriage 9 relative to the recording medium M, and the transport device 14 which is a roller to transport the recording medium M in a sub-scanning direction are provided. The operations of the carriage transfer mechanism 13 and the transport device 14 are controlled by the control portion CONT.

Figure 4:
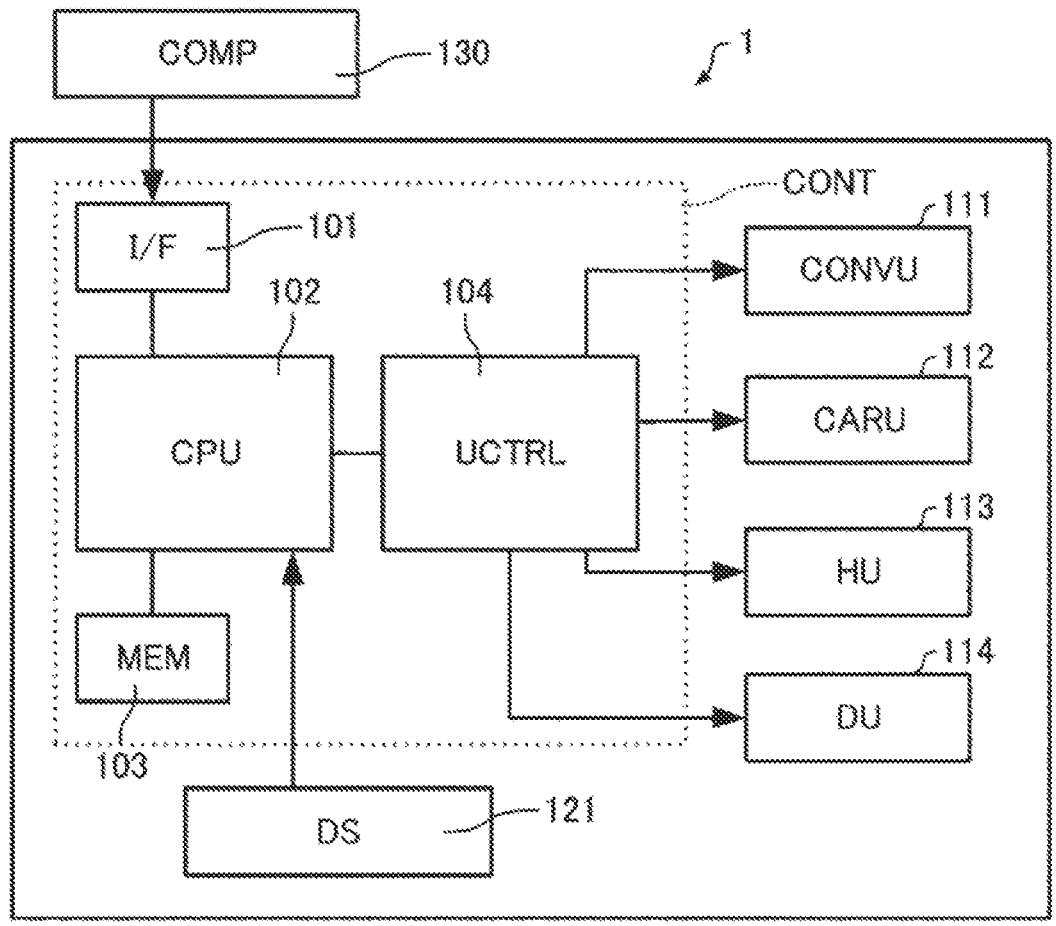
FIG. 4 is a block diagram of one example of the ink jet recording apparatus according to the embodiment.

FIG. 4 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A conveyer unit 111 (CONVU) is a unit to control the sub-scanning (transport) of the ink jet recording and, in particular, is a unit to control a transport direction, a transport distance, and a transport rate of the recording medium M. In particular, by controlling a rotation direction, a rotation amount, and a rotation rate of a transport roller driven by a motor, the transport direction, the transport distance, and the transport rate of the recording medium M are controlled.

A carriage unit 112 (CARU) is a unit to control the main scanning (pass) of the ink jet recording and, in particular, is a unit to reciprocally transfer the ink jet head 2 in the main scanning direction. The carriage unit 112 includes the carriage 9 mounting the ink jet head 2 and the carriage transfer mechanism 13 to reciprocally transfer the carriage 9.

A head unit 113 (HU) is a unit to control an ejection amount of the composition from the nozzle of the ink jet head 2. For example, when the nozzle of the ink jet head 2 is driven by a piezoelectric element, the operation of the piezoelectric element of each nozzle is controlled. By the head unit 113, for example, an adhesion timing of each composition and a dot size thereof are controlled. In addition, by combination of the controls by the carriage unit 112 and the head unit 113, an adhesion amount of the composition per one scanning is controlled.

When the first treatment liquid is selected as the treatment liquid used for recording, the head unit 113 is able to control such that from the nozzle of the ink jet head 2, the second treatment liquid is not ejected, and the first treatment liquid is ejected. Accordingly, the first recording can be performed. In addition, when the second treatment liquid is selected as the treatment liquid used for recording, the head unit 113 is able to control such that from the nozzle of the ink jet head 2, the first treatment liquid is not ejected, and the second treatment liquid is ejected. As a result, the second recording can be performed.

A drying unit 114 (DU) controls the temperatures of various types of heaters, such as the IR heater 3, the pre-heater 7, the platen heater 4, and the heating heater 5.

The detector group 121 (DS) is to monitor the state in the ink jet recording apparatus 1. For example, it is detected whether the type of the recording medium M is a low-permeable substrate or an impermeable substrate. When the low-permeable substrate is detected as the type of the recording medium M, the control portion CONT controls the head unit 113 such that from the nozzle of the ink jet head 2, the second treatment liquid is not ejected, and the first treatment liquid is ejected. When the impermeable substrate is detected as the type of the recording medium M, the control portion CONT controls the head unit 113 such that from the nozzle of the ink jet head 2, the first treatment liquid is not ejected, and the second treatment liquid is ejected.

In the ink jet recording apparatus 1 described above, an operation to transfer the carriage 9 mounting the ink jet head 2 in the main scanning direction and a transport operation (sub-scanning) are alternately performed. In the case described above, when each pass is performed, the control portion CONT controls the carriage unit 112 such that the ink jet head 2 is transferred in the main scanning direction and also controls the head unit 113 such that a liquid droplet of the composition is ejected from a predetermined nozzle hole of the ink jet head 2, so that the liquid droplet of the composition is adhered to the recording medium M. In addition, the control portion CONT controls the conveyer unit 111 such that when the transport operation is performed, the recording medium M is transported by a predetermined transport amount (feed amount) in the transport direction.

In the ink jet recording apparatus 1, since the main scanning (pass) and the sub-scanning (transport operation) are repeatedly performed, a recording region to which a plurality of liquid droplets is adhered is gradually transported. In addition, by the heating heater 5, the liquid droplets adhered to the recording medium M are dried, so that an image is completed. Subsequently, a recorded matter thus completed may be wound in the form of a roller by a winding mechanism or may be transported by a flat bed mechanism.

Heretofore, the serial type recording apparatus in which a serial type ink jet head is mounted, and a serial type recording method is performed is described. On the other hand, the ink jet head 2 may be a line type head. An ink jet head of the line type recording apparatus is a head in which nozzles are disposed along a line larger than the length of a recording width of the recording medium M, and the ink composition is adhered to the recording medium M by one pass. In addition, as the ink jet head 2, a lateral type head may also be used. The lateral type head is a head (carriage) provided with a mechanism so as to be transferred in an X direction and a Y direction (a main scanning direction and a sub-scanning direction) as disclosed in JP-A-2002-225255.

As the recording apparatus according to this embodiment, any one of a serial type, a line type, and a lateral type recording apparatus may be used.

3. Recording Method

A recording method according to one embodiment of the present disclosure is a recording method which performs recording on a recording medium using the ink set described above and which includes a step of selecting a treatment liquid used for recording from the first treatment liquid and the second treatment liquid described above, a step of adhering the treatment liquid thus selected to the recording medium, and a step of adhering the ink composition to the recording medium, and the recording described above is a first recording in which the selected treatment liquid is the first treatment liquid and the recording medium is a low-permeable substrate or a second recording in which the selected treatment liquid is the second treatment liquid and the recording medium is an impermeable substrate. According to the recording method of this embodiment, by the use of the ink set described above, the recording can be performed by selecting a treatment liquid to be used in accordance with the recording medium. Accordingly, in both a recorded matter including a low-permeable substrate and a recorded matter including an impermeable substrate, excellent image quality (burying property and granularity) and abrasion resistance can be obtained.

The recording medium which is a low-permeable substrate and the recording medium which is an impermeable substrate, on each of which the recording is performed by the recording method of this embodiment, each may be configured to have the structure similar to that described above.

3.1. Selection Step

The recording method according to this embodiment includes a step (selection step) of selecting a treatment liquid used for recording from the first treatment liquid and the second treatment liquid described above.

In the selection step, when the first treatment liquid is selected as the treatment liquid used for recording, the recording can be performed on a recording medium which is a low-permeable substrate, that is, the first recording can be performed. On the other hand, when the second treatment liquid is selected as the treatment liquid used for recording, the recording can be performed on a recording medium which is an impermeable substrate, that is, the second recording can be performed. As described above, in the recording method according to this embodiment, since the recording can be performed by selecting a treatment liquid to be used in accordance with the recording medium, in both the recorded matter including a low-permeable substrate and the recorded matter including an impermeable substrate, excellent image quality (burying property and granularity) and abrasion resistance can be obtained.

As a selection method, for example, there may be mentioned a method in which an input is performed by a user from an input portion of a recording apparatus, a method in which selection is performed by a treatment liquid to be filled in a recording apparatus, or a method in which selection is automatically performed by a recording apparatus based on recording conditions, such as the type of recording medium.

3.2. Treatment Liquid Adhesion Step

The recording method according to this embodiment includes a step (treatment liquid adhesion step) of adhering the selected treatment liquid to the recording medium. That is, when the first treatment liquid is selected in the selection step described above, in the treatment liquid adhesion step, the first treatment liquid is adhered to the recording medium. On the other hand, when the second treatment liquid is selected in the selection step described above, in the treatment liquid adhesion step, the second treatment liquid is adhered to the recording medium.

In addition, a method to adhere the treatment liquid to the recording medium is not particularly limited, and for example, the adhesion may be performed by coating using a brush, coating using a roller, spray coating, coating using a bar coater, or an ink jet method. Among those mentioned above, the treatment liquid is preferably adhered to the recording medium by an ink jet method. Accordingly, in both the recorded matter including a low-permeable substrate and the recorded matter including an impermeable substrate, more excellent image quality and abrasion resistance tend to be obtained.

An adhesion amount of the treatment liquid (treatment liquid adhesion amount A) per unit area of a recording region of the recording medium is preferably 2.0 mg/inch$^2$ or less, more preferably 1.5 mg/inch$^2$ or less, and further preferably 1.2 mg/inch$^2$ or less. Although not particularly limited, a lower limit of the adhesion amount described above is preferably 0.3 mg/inch$^2$ or more and more preferably 0.5 mg/inch$^2$ or more. Furthermore, the above lower limit is preferably more than 0.6 mg/inch$^2$, more preferably more than 0.8 mg/inch$^2$, and further preferably more than 1.0 mg/inch$^2$. When the adhesion amount of the treatment liquid is in the range described above, in both the recorded matter including a low-permeable substrate and the recorded matter including an impermeable substrate, more excellent image quality and abrasion resistance tend to be obtained.

In addition, in accordance with an adhesion amount of the ink composition which will be described below, the adhesion amount of the treatment liquid preferably has two levels or more. Accordingly, since the reaction between the ink and the treatment liquid can be appropriately controlled, in the recorded matter including a low-permeable substrate and the recorded matter including an impermeable substrate, more excellent image quality and abrasion resistance tend to be obtained.

When the adhesion amount of the ink composition in the ink adhesion step which will be described below is set to an ink adhesion amount A, it is preferable that the adhesion amount of the treatment liquid to this recording region is set to a treatment liquid adhesion amount A, and the treatment liquid adhesion step is performed. On the other hand, when the adhesion amount of the ink composition in the ink adhesion step which will be described below is set to an ink adhesion amount B, it is preferable that the adhesion amount of the treatment liquid to this recording region is set to a treatment liquid adhesion amount B which will be described below, and the treatment liquid adhesion step is performed. The treatment liquid adhesion amount A corresponds to the adhesion amount of the treatment liquid in the recording region in which the ink adhesion amount is the maximum adhesion amount in the recording.

The treatment liquid adhesion amount B corresponds to the adhesion amount of the treatment liquid in the recording region in which the ink adhesion amount is a predetermined adhesion amount smaller than the maximum ink adhesion amount in the recording.

The treatment liquid adhesion amount B per unit area of the recording region of the recording medium is preferably 1.0 mg/inch$^2$ or less, more preferably 0.8 mg/inch$^2$ or less, and further preferably 0.6 mg/inch$^2$ or less. Although not particularly limited, a lower limit of the adhesion amount described above is preferably 0.05 mg/inch$^2$ or more and more preferably 0.1 mg/inch$^2$ or more. Furthermore, the lower limit described above is preferably more than 0.3 mg/inch$^2$, more preferably more than 0.4 mg/inch$^2$, and further preferably more than 0.5 mg/inch$^2$.

In addition, the treatment liquid adhesion amount A is larger than the treatment liquid adhesion amount B preferably by 0.2 mg/inch$^2$ or more, more preferably by 0.4 mg/inch$^2$ or more, even more preferably by 0.6 mg/inch$^2$ or more, and further preferably by 0.6 to 1.0 mg/inch$^2$.

In addition, the treatment liquid adhesion amount B is preferably 40% to 60% of the treatment liquid adhesion amount A and more preferably 45% to 55% thereof.

In the treatment liquid adhesion step, the liquid droplets of the treatment liquid are preferably adhered to form a regular pattern. Accordingly, since the treatment liquid is uniformly adhered to the recording medium, the ink droplets and the treatment liquid droplets are likely to be brought into contact with each other, and in both the recorded matter including a low-permeable substrate and the recorded matter including an impermeable substrate, more excellent image quality and abrasion resistance tend to be obtained.

In this case, the "regular pattern" refers to a pattern in which liquid droplets to be adhered to dots represented by a printing resolution [dpi] are arranged in a regular manner.

Figure 5:
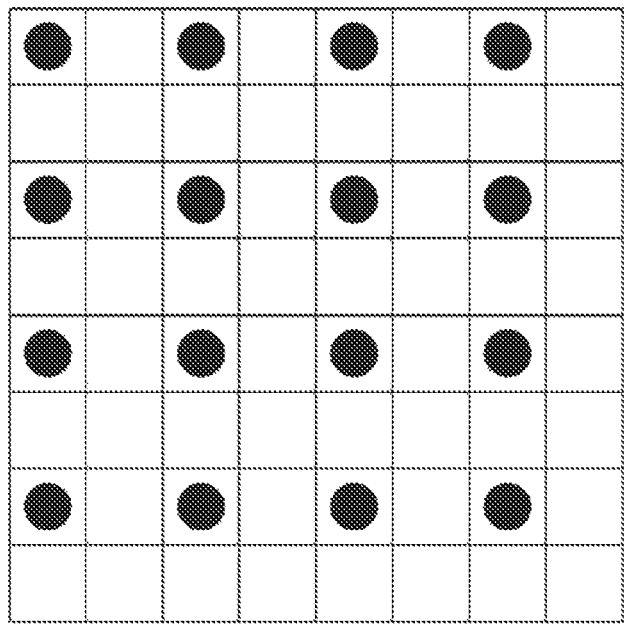
FIG. 5 is a schematic view showing a regular pattern.

FIG. 5 is a schematic view showing a regular pattern. One square shown in FIG. 5 corresponds to one dot represented by the printing resolution [dpi], and a black circle represents an adhered liquid droplet. For example, FIG. 5 shows a regular pattern in which a one-half liquid droplet is adhered to each dot of the printing resolution [dpi] (one droplet per 2 dots). In a manner similar to that described above, for example, when a one-third, a one-fourth, a one-fifth, or a one-sixth liquid droplet is adhered to each dot of the printing resolution [dpi], a regular pattern is also formed.

In addition, when the liquid droplets are regularly arranged in one raster extended in a main scanning direction, and when the liquid droplets are regularly arranged in one raster extended in a sub-scanning direction, this pattern is a regular pattern. For example, when the liquid droplets are arranged in one raster extended in a main scanning direction such that a one-half liquid droplet is adhered to each dot of the printing resolution [dpi], and when the liquid droplets are arranged in one raster extended in a sub-scanning direction such that a one-fifth liquid droplet is adhered to each dot of the printing resolution [dpi], this pattern is a regular pattern.

On the other hand, an "irregular pattern" refers to a pattern other than the regular pattern described above. For example, in the arrangement of liquid droplets in one raster extended in a main scanning direction, when the arrangement of approximately 10 liquid droplets are confirmed, and the arrangement thereof is not regular, this pattern is regarded as an irregular pattern.

In the recording method according to this embodiment, the recording resolution of the treatment liquid is preferably 1,200×1,200 dpi or more and is more preferably 1,200×1,200 dpi or more per one main scanning. When the recording resolution is as described above, in both the recorded matter including a low-permeable substrate and the recorded matter including an impermeable substrate, more excellent image quality and abrasion resistance tend to be obtained.

3.3. Ink Adhesion Step

The recording method according to this embodiment includes a step (ink adhesion step) of adhering the ink composition to the recording medium.

In addition, a method to adhere the ink composition to the recording medium is not particularly limited, and for example, the adhesion by a spray coating method or an ink jet method may be performed. Among those mentioned above, the ink composition is preferably adhered to the recording medium by an ink jet method. Accordingly, in both the recorded matter including a low-permeable substrate and the recorded matter including an impermeable substrate, more excellent image quality and abrasion resistance tend to be obtained. In addition, a clear ink composition adhesion step and a white ink adhesion step each of which will be described below can also be performed in a manner similar to that described above.

The adhesion amount of the ink composition may have two levels or more, if needed. For example, the ink adhesion amount A per unit area of the recording region of the recording medium is preferably 20.0 mg/inch$^2$ or less, more preferably 15.0 mg/inch$^2$ or less, and further preferably 10.0 mg/inch$^2$ or less. Furthermore, the ink adhesion amount A is preferably 8.0 mg/inch$^2$ or less. Although not particularly limited, a lower limit of the adhesion amount described above is preferably more than 0.6 mg/inch$^2$, more preferably more than 0.8 mg/inch$^2$, and further preferably more than 1.0 mg/inch$^2$. Furthermore, the lower limit described above is preferably 4.0 mg/inch$^2$ or more and more preferably 5.0 mg/inch$^2$ or more. The ink adhesion amount A corresponds to the maximum ink adhesion amount in the recording.

The ink adhesion amount B corresponds to a predetermined ink adhesion amount smaller than the maximum ink adhesion amount in the recording.

For example, the ink adhesion amount B per unit area of the recording region of the recording medium is preferably 10.0 mg/inch$^2$ or less, more preferably 8.0 mg/inch$^2$ or less, and further preferably 6.0 mg/inch$^2$ or less. Although not particularly limited, a lower limit of the adhesion amount described above is preferably more than 0.3 mg/inch$^2$, more preferably more than 0.4 mg/inch$^2$, and further preferably more than 0.5 mg/inch$^2$. Furthermore, the lower limit described above is preferably 1.0 mg/inch$^2$ or more and more preferably 2.0 mg/inch$^2$ or more.

The ink adhesion amount B is preferably 60% to 80% of the ink adhesion amount A and more preferably 65% to 75% thereof.

In addition, the ink adhesion amount A is larger than the ink adhesion amount B and is larger preferably by 0.2 mg/inch$^2$ or more, more preferably by 0.4 mg/inch$^2$ or more, further preferably by 0.6 mg/inch$^2$ or more, and particularly preferably by 1.0 to 3.0 mg/inch$^2$.

In the recording method according to this embodiment, the treatment liquid and the ink composition are ejected and adhered to the recording medium in the same scanning so as to be overlapped with each other, and the maximum time lag between the adhesion of the treatment liquid and the adhesion of the ink composition is preferably one second or less. In the case as described above, in both the recorded matter including a low-permeable substrate and the recorded matter including an impermeable substrate, more excellent image quality and abrasion resistance tend to be obtained.

In addition, "the treatment liquid and the ink composition are ejected and adhered to the recording medium in the same scanning so as to be overlapped with each other" may be performed such that the treatment liquid and the ink composition are adhered to the same scanning region of the recording medium by the same main scanning. The operation described above is also called a simultaneous ejection.

In addition, the "maximum time lag between the adhesion of the treatment liquid and the adhesion of the ink composition" indicates a time lag between the adhesion of the treatment liquid to the recording medium and the adhesion of the ink composition thereto. When at least two ink compositions are used, the time lag described above indicates the maximum time lag.

The maximum time lag described above is more preferably 0.8 seconds or less and further preferably 0.6 seconds or less. In addition, although not particularly limited, a lower limit of the time lag is preferably 0.1 seconds or more, more preferably 0.3 seconds or more, and further preferably 0.5 seconds or more.

3.4. Clear Ink Adhesion Step

The recording method according to this embodiment may further include a step (clear ink adhesion step) of adhering the clear ink composition containing a resin described above to the recording medium. By this step, the abrasion resistance tends to be further improved.

An adhesion amount of the clear ink composition per unit area of the recording region of the recording medium is preferably 5 mg/inch$^2$ or less, more preferably 3 mg/inch$^2$ or less, and further preferably 2 mg/inch$^2$ or less. Although not particularly limited, a lower limit of the adhesion amount described above is preferably more than 0.1 mg/inch$^2$, more preferably more than 0.3 mg/inch$^2$, and further preferably more than 0.5 mg/inch$^2$.

3.5. White Ink Adhesion Step

The recording method according to this embodiment may also include a step (white ink adhesion step) of adhering the white ink composition described above to the recording medium. Even in the case as described above, in both the recorded matter including a low-permeable substrate and the recorded matter including an impermeable substrate, more excellent image quality and abrasion resistance tend to be obtained.

An adhesion amount of the white ink composition per unit area of the recording region of the recording medium is preferably 20 mg/inch$^2$ or less, more preferably 17 mg/inch$^2$ or less, and further preferably 15 mg/inch$^2$ or less. Although not particularly limited, a lower limit of the adhesion amount described above is preferably more than 5 mg/inch$^2$, more preferably more than 7 mg/inch$^2$, and further preferably more than 9 mg/inch$^2$.

In addition, the order of the treatment liquid adhesion step, the ink adhesion step, the clear ink adhesion step, and the white ink adhesion step is not particularly limited. For example, after the treatment liquid adhesion step or simultaneously therewith, the ink adhesion step or the like may be performed, or after the ink adhesion step or the like, the treatment liquid adhesion step may be performed.

3.6. Primary Drying Step

The recording method according to this embodiment may further include a primary drying step of drying the liquid droplets adhered to the recording medium. Since the step as described above is performed, at an early stage at which the ink composition or the like is adhered to the recording medium, a drying property of the ink can be improved, and a more excellent abrasion resistance may be obtained in some cases. In addition, the recording method according to this embodiment preferably includes no primary drying step which is performed with heating.

The primary drying step is a step of drying the ink at an early stage at which the ink composition or the like is adhered to the recording medium. The primary drying step is a drying step of drying at least part of a solvent component of the ink so as to at least decrease the fluidity of the ink adhered to the recording medium. An ink droplet landed on the recording medium preferably starts to be dried by the primary drying step within at most 0.5 seconds after the landing of the ink droplet.

As a method of the primary drying step, for example, there may be mentioned a ventilation method in which a wind at ordinary temperature (ordinary temperature wind) or a heated wind (hot wind) is supplied to a recording medium by a fan or the like; a radiation method using an IR heater or microwaves; a conduction method in which a recording medium is heated by a platen heater or the like; or a method performed in combination of those described above.

In the primary drying step, when the drying is performed by ventilation, a wind velocity of the ventilation is preferably 0.5 to 15 m/s, more preferably 0.5 to 10 m/s, further preferably 1 to 5 m/s, and particularly preferably 2 to 3 m/s. The wind velocity is a wind velocity in the vicinity of the surface of the recording medium.

A wind temperature of the ventilation is preferably ° C. or less and is preferably 10° C. or more. In addition, the wind temperature described above is preferably 15° C. to ° C. and more preferably 20° C. to 49° C. Furthermore, the wind temperature described above is preferably 23° C. to 40° C., more preferably 25° C. to 35° C., and further preferably 25° C. to 28° C. The wind temperature of the ventilation may also be ordinary temperature.

In the case in which the primary drying step is performed or not performed, the surface temperature of the recording medium in the ink adhesion step is preferably ° C. or less, more preferably 40.0° C. or less, further preferably 38.0° C. or less, and particularly preferably ° C. or less. A lower limit of the surface temperature of the recording medium M is preferably 25.0° C. or more, more preferably 28.0° C. or more, further preferably 30.0° C. or more, and particularly preferably 32.0° C. or more.

In addition, when the primary drying step is performed with heating, the primary drying step may be performed such that the ink is adhered to a heated recording medium, or the ink is heated at an early stage after the adhesion thereof. In the primary drying step, an ink droplet landed on the recording medium preferably starts to be heated within at most 0.5 seconds after the landing of the ink droplet.

When the primary drying step is performed with heating, the heating may be performed at least before the ink adhesion step described above or the like, simultaneously with the ink adhesion, or at an early stage thereafter and is preferably performed simultaneously with the ink adhesion. By the heating order as described above, for example, the ink adhesion step may be performed.

In addition, when the ink is adhered to the recording medium processed by the primary drying step, the surface temperature of the recording medium in the primary drying step is a surface temperature of the recording medium when the ink is adhered thereto, and when the primary drying step is performed at an early stage after the ink adhesion, the surface temperature of the recording medium in the primary drying step is a surface temperature of the recording medium when the primary drying step is performed. In addition, the surface temperature of the recording medium in the primary drying step is the maximum temperature by the primary drying step. The surface temperature of the recording medium in the primary drying step in the case described above is preferably set in the range of the surface temperature described above.

In addition, when the primary drying step is performed without heating, the surface temperature of the recording medium is a surface temperature of the recording medium when the ink is adhered thereto.

3.7. Post Heating Step

The recording method according to this embodiment may include a post heating step of heating the recording medium to which the treatment liquid and the ink composition are adhered so that after the recording medium passes over the platen, the surface thereof is heated to preferably 60° C. to 120° C., more preferably 70° C. to 110° C., and further preferably 80° C. to 100° C. Accordingly, the drying property is further improved, and a recorded matter having a more excellent abrasion resistance preferably tends to be obtained.

The post heating step is a step to compete the recording and to sufficiently dry a recorded matter so as to be usable. The post heating step is a heating step to flatten a coating film of the ink by sufficiently drying the solvent component of the ink and the like and by heating the resin particles and the like contained in the ink.

In addition, for example, when an ink jet recording apparatus is used, the heating of the recording medium in the post heating step may be performed by using an appropriate heating device. In addition, besides the heating device provided in the ink jet recording apparatus, the heating may be performed by using an appropriate heating device.

In the post heating step, a lower limit of the surface temperature of the recording medium is preferably 50° C. or more, more preferably 60° C. or more, and further preferably 70° C. or more. An upper limit of the surface temperature of the recording medium is preferably 120° C. or less, more preferably 110° C. or less, even more preferably 100° C. or less, further preferably 90° C. or less, and particularly preferably 80° C. or less.

In addition, a preferable temperature in the primary drying step is preferably different from a preferable temperature in the post heating step.

4. Examples

Hereinafter, although the present disclosure will be described in more detail with reference to Examples, the present disclosure is not limited thereto. Hereinafter, unless otherwise particularly described, "%" is represented on a mass basis.

4.1. Dynamic Permeability Measurement of Recording Medium

Measurement of dynamic permeabilities of a low-permeable substrate, an impermeable substrate, and a permeable substrate used in Examples and Comparative Examples was performed using a dynamic permeability tester DPM33 (manufactured by emco). As the recording medium, cast paper named "GlossPW" and "Cast73" was used as the low-permeable substrate, films named "PET50A" and "PP WHITE" were used as the impermeable substrate, and high-quality paper named "55PW" was used as the permeable substrate. The measurement results are shown in the following Table 1.

In addition, "VALUE AFTER 60 SECONDS" in the following Table 1 indicates a $10 \log_{10} (A/A_0)$ value of the following equation (1), and "VALUE AFTER 10 SECONDS" is a $10 \log_{10} (A/A_0)$ value of the following equation (1) measured 10 seconds after water dripping instead of measured 60 seconds after water dripping. As a standard substrate of the following equation (1), "PET50A" was used.

In addition, "CONTACT ANGLE" represents a static contact angle and was measured in accordance with a static drip method of JIS R 3257 (wettability test method for plate glass surface).

$$10 \log_{10}(A/A_0) < -5 \text{ [dB]} \qquad \text{Equation (1)}$$

$A_0$ represents a permeability in the standard substrate 60 seconds after water dripping, and A represents a permeability in an object substrate 60 seconds after water dripping.

TABLE 1

| | SUBSTRATE TYPE | | | | |
| --- | --- | --- | --- | --- | --- |
| | HIGH-QUALITY PAPER | CAST PAPER | CAST PAPER | FILM | FILM |
| | SUBSTRATE NAME | | | | |
| | 55PW | GLOSS PW | CAST 73 | PET50A | PP WHITE |
| PERMEABILITY | HIGH | LOW | LOW | NO | NO |
| VALUE AFTER 60 SECONDS [dB] | −7 | −9 | −10 | 0 | 0 |
| VALUE AFTER 10 SECONDS [dB] | −4 | −1 | −1 | 0 | 0 |
| CONTACT ANGLE [°] | 116 | 106 | 94 | 88 | 91 |

As shown in the above Table 1, as the permeability in the impermeable substrate, the value after 60 seconds and the value after 10 seconds both tended to be low. On the other hand, as the permeability in the low-permeable substrate, the value after 10 seconds was low, but the value after 60 seconds tended to be higher than that of the permeable substrate.

4.2. Preparation of Treatment Liquid

After components were charged in a container to have one of the compositions shown in the following Table 2 and were then mixed and stirred for 2 hours by a magnetic stirrer, filtration was performed using a membrane filter having a pore size of 5 μm, so that each of treatment liquids (A1 to A4 and B1 to B3) of Examples and Comparative Examples was obtained. The numerical values in the following Table 2 were each represented by percent by mass, and the pure water was added so that the total mass of the treatment liquid was 100 percent by mass.

4.3. Preparation of Composition

After components were charged in a container to have one of the compositions shown in the following Table 3 and were then mixed and stirred for 2 hours by a magnetic stirrer, filtration was performed using a membrane filter having a pore size of 5 μm, so that each of an ink composition (C1), a white ink composition (W1), and a clear ink composition (CL1) was obtained. The numerical values in the following Table 3 were each represented by percent by mass, and the pure water was added so that the total mass of the composition was 100 percent by mass. In addition, the numerical values of the resin particles and the wax in the following Table 3 are each not on a resin solid content basis and each represent the total liquid mass.

In addition, although not shown in the tables, in the treatment liquid B1, when a treatment liquid was prepared in a manner similar to that of the treatment liquid B1 except for that a content of calcium formate was changed to 10 percent by mass (0.77 mol/kg), calcium formate was not sufficiently dissolved, and hence, the treatment liquid thus prepared was not suitably used.

In addition, as for a cyan pigment in the ink composition and a white pigment in the white ink composition, the following pigment dispersion liquid was prepared in advance.

<Cyan Pigment Dispersion Liquid>

First, in 160.5 parts by mass of ion exchange water in which 2 parts by mass of a 30%-ammonia aqueous solution (neutralizer) was dissolved, 7.5 parts by mass of an acrylic acid-acrylic acid ester copolymer (weight average molecular weight: 25,000, acid value: 180) was added and dissolved as a resin dispersant. In the mixture thus prepared, 30 parts by mass of C.I. Pigment Blue 15:3 was added as a cyan pigment, and a dispersion treatment was then performed for 10 hours by a ball mill using zirconia beads. Subsequently, coarse particles and impurities, such as trash, were removed by centrifugal filtration using a centrifugal machine, and the concentration of the cyan pigment was adjusted to 15 percent by mass, so that a cyan pigment dispersion liquid was obtained. In this case, the particle diameter of the cyan pigment was 100 nm as the average particle diameter.

<White Pigment Dispersion Liquid>

First, in 155 parts by mass of ion exchange water in which 0.1 parts by mass of a 30%-ammonia aqueous solution (neutralizer) was dissolved, 4 parts by mass of an acrylic acid-acrylic acid ester copolymer (weight average molecular weight: 25,000, acid value: 18) was added and dissolved as a resin dispersant. In the mixture thus prepared, 40 parts by mass of titanium dioxide (C.I. Pigment White 6) was added as a white pigment, and a dispersion treatment was then performed for 10 hours by a ball mill using zirconia beads. Subsequently, coarse particles and impurities, such as trash, were removed by centrifugal filtration using a centrifugal machine, and the concentration of the white pigment was adjusted to 20 percent by mass, so that a white pigment dispersion liquid was obtained. The particle diameter of the white pigment was 350 nm as the average particle diameter.

TABLE 2

|  |  | A1 | A2 | A3 | A4 | B1 | B2 | B3 |
| --- | --- | --- | --- | --- | --- | --- | --- | --- |
| AGGREGATING AGENT | CALCIUM NITRATE TETRAHYDRATE | 20 | 22 | 7 |  |  |  |  |
|  | CALCIUM BROMIDE |  |  |  | 17 |  |  |  |
|  | CALCIUM FORMATE |  |  |  |  | 5 | 2.5 |  |
|  | CALCIUM PROPIONATE |  |  |  |  |  |  | 6.9 |
| SURFACTANT | BYK348 | 0.5 | 0.5 | 0.5 | 0.5 | 0.5 | 0.5 | 0.5 |
| ORGANIC | 1,2-HEXANEDIOL | 5 | 5 | 5 | 5 | 5 | 5 | 5 |
| SOLVENT | PROPYLENE GLYCOL | 25 | 25 | 25 | 25 | 25 | 25 | 25 |
| AMINE | TRIISOPROPANOLAMINE | 0.1 | 0.1 | 0.1 | 0.1 | 0.005 | 0.005 | 0.005 |
|  | PURE WATER | BALANCE | BALANCE | BALANCE | BALANCE | BALANCE | BALANCE | BALANCE |
|  | TOTAL | 100 | 100 | 100 | 100 | 100 | 100 | 100 |
|  | mol/kg | 0.85 | 0.93 | 0.30 | 0.85 | 0.38 | 0.19 | 0.37 |

TABLE 3

|  |  | W1 | C1 | CL1 |
| --- | --- | --- | --- | --- |
| COLORANT | WHITE PIGMENT (TITANIUM OXIDE) | 15 |  |  |
|  | CYAN PIGMENT (P.B. 15:3) |  | 3 |  |
| SURFACTANT | BYK348 | 0.5 | 0.5 | 0.5 |
| ORGANIC | 1,2- HEXANEDIOL | 5 | 5 |  |
| SOLVENT | PROPYLENE GLYCOL | 10 | 10 | 17 |
| CHELATING AGENT | EDTA | 0.01 |  |  |
| AMINE | TRIISOPROPANOLAMINE |  | 0.3 | 0.5 |
| RESIN PARTICLES | JONCRYL 631 (RESIN SOLID CONTENT: 50%) | 12 | 4 | 20 |
| WAX | HITEC E-6500 (RESIN SOLID CONTENT: 35%) | 2 | 2 | 6 |
|  | PURE WATER | BALANCE | BALANCE | BALANCE |
|  | TOTAL | 100 | 100 | 100 |

The description of the above Tables 2 and 3 will be further explained.

(Aggregating Agent)
- calcium nitrate tetrahydrate: solubility in 100 g of water at 20° C. (hereinafter, simply referred to as "solubility") of 129 [g/100 g of water]
- calcium bromide: solubility of 143 [g/100 g of water]
- calcium formate: solubility of 16.6 [g/100 g of water]
- calcium propionate: solubility of 10 [g/100 g of water]

(Colorant)
- white pigment (titanium oxide): C.I. Pigment White 6
- Cyan pigment (P.B. 15:3): C.I. Pigment Blue 15:3

(Surfactant)
- BYK 348: trade name, silicone-based surfactant, manufactured by BYK Japan KK (Chelating Agent)
- EDTA: ethylenediaminetetraacetic acid (Resin Particles)
- Joncryl 631: trade name, styrene-acrylic-based resin, manufactured by BASF (Wax)
- Hitec E-6500: trade name, polyethylene wax, manufactured by Toho Chemical Industry Co., Ltd.

In addition, "mol/kg" in the above Table 2 indicates the number of moles [mol] of the aggregating agent with respect to the total mass [kg] of the treatment liquid.

4.4. Recording Test

An ink set including the treatment liquid, the ink composition, the white ink composition, and the clear ink composition obtained as described above was filled in a printer (modified machine of "SurePress L-4533AW, manufactured by Seiko Epson Corporation), and based on the description of the following Tables 4 to 8, printing was performed under the following recording conditions.

In addition, in each example, the ink set filled in the printer included at least one of the treatment liquids A1 to A4 and at least one of the treatment liquids B1 to B3, and in accordance with the type of the recording medium, a treatment liquid to be used was selected. On the other hand, in Comparative Example 1, in the ink set filled in the printer, the treatment liquid A1 was only included, and in Comparative Example 2, in the ink set filled in the printer, the treatment liquid B1 was only included.

[Recording Conditions]
- Printer: modified machine of "SurePress L-4533AW"
- Resolution: 1,200×1,200 dpi, this resolution was used as a base resolution, and the number of liquid droplets per pixel was adjusted so that the adhesion amount was set to that of each example.
- Printing pattern: in printing for evaluation of burying property, granularity, abrasion resistance, and color development property, a solid pattern was used. In printing for evaluation of characters, a character printing was performed. In addition, the "solid pattern" indicates a predetermined pattern recorded for evaluation.
- Treatment liquid conditions: conditions shown in the following Tables 4 to 8 were used.
- Ink composition conditions: the mass per one droplet (Iw) was set to 5 ng. In addition, the adhesion amounts were set to 6 and 4 mg/inch$^2$ for a high duty test and a medium duty test, respectively.
- White ink composition conditions: the mass per one droplet (Iw) was set to 10 ng. In addition, the adhesion amount was set to 13 mg/inch$^2$.
- Clear ink composition conditions: the mass per one droplet (Iw) was set to 5 ng. In addition, the adhesion amount was set to 1 mg/inch$^2$.
- Number of scannings: one time; however, in Examples 13 and 14, the number of scannings was set to two times (=1+1).
- Primary drying temperature: No intentional heating was performed; however, in Example 11, heating was performed by a platen heater to have a temperature shown in the table.
- Post heating temperature: 70° C.
- Recording medium: recording media shown in the above Table 1 and the following Tables 4 to 8 were used.
- Simultaneous ejection of the ink composition and the treatment liquid was performed.

TABLE 4

| | | No. | | | | | |
|---|---|---|---|---|---|---|---|
| | | EXAMPLE 1 | | | EXAMPLE 2 | | |
| SUBSTRATE TYPE | | HIGH-QUALITY PAPER | CAST PAPER | FILM | HIGH-QUALITY PAPER | CAST PAPER | PP |
| SUBSTRATE NAME | | 55PW | GLOSS PW | PET50A | 55PW | CAST 73 | PP WHITE |
| PERMEABILITY | | HIGH | LOW | NO | HIGH | LOW | NO |
| TREATMENT LIQUID | COMPOSITION | A1 | A1 | B1 | A1 | A1 | B1 |
| | Iw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.2 | 1.2 | 1.2 | 1.2 |
| | ADHESION AMOUNT mg/inch2 (INK MEDIUM DUTY) | 0.6 | 0.6 | 0.6 | 0.6 | 0.6 | 0.6 |
| | TIME LAG TO INK ADHESION [sec] | | 0.6 | | | 0.6 | |
| SURFACE TEMPERATURE AT ADHESION | | | 25° C. | | | 25° C. | |
| INK | | | C1 | | | C1 | |
| CLEAR INK | COMPOSITION | | CL1 | | | CL1 | |
| | RECORDING METHOD | REGULAR | REGULAR | REGULAR | REGULAR | REGULAR | REGULAR |
| EVALUATION/ HIGH DUTY SIDE | BURYING PROPERTY | A | A | A | A | A | A |
| | GRANULARITY | A | A | B | A | A | A |
| | CHARACTER | B | B | A | B | B | A |
| | ABRASION RESISTANCE | A | A | A | A | A | A |

TABLE 4-continued

|  |  |  |  |  |  |  |  |
|---|---|---|---|---|---|---|---|
|  | COLOR DEVELOPMENT PROPERTY | A | A | A | A | A | A |
| EVALUATION/ MEDIUM DUTY SIDE | BURYING PROPERTY | A | A | A | A | A | A |
|  | GRANULARITY | A | A | B | A | A | A |
|  | CHARACTER | B | B | A | B | B | A |
|  | ABRASION RESISTANCE | A | A | A | A | A | A |
|  | COLOR DEVELOPMENT PROPERTY | A | A | A | A | A | A |

| | | No. | | | | | |
|---|---|---|---|---|---|---|---|
| | | EXAMPLE 3 | | | EXAMPLE 4 | | |
| SUBSTRATE TYPE | | HIGH-QUALITY PAPER | CAST PAPER | FILM | HIGH-QUALITY PAPER | CAST PAPER | FILM |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A2 | A2 | B1 | A1 | A1 | B2 |
| | lw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.2 | 1.2 | 1.2 | 1.2 |
| | ADHESION AMOUNT mg/inch2 (INK MEDIUM DUTY) | 0.6 | 0.6 | 0.6 | 0.6 | 0.6 | 0.6 |
| | TIME LAG TO INK ADHESION [sec] | | 0.6 | | | 0.6 | |
| SURFACE TEMPERATURE AT ADHESION | | | 25° C. | | | 25° C. | |
| INK | | | C1 | | | C1 | |
| CLEAR INK | COMPOSITION | | CL1 | | | CL1 | |
| | RECORDING METHOD | REGULAR | REGULAR | REGULAR | REGULAR | REGULAR | REGULAR |
| EVALUATION/ HIGH DUTY SIDE | BURYING PROPERTY | B | B | A | A | A | A |
| | GRANULARITY | A | A | B | A | A | B |
| | CHARACTER | A | A | A | B | B | B |
| | ABRASION RESISTANCE | A | A | A | A | A | A |
| | COLOR DEVELOPMENT PROPERTY | A | A | A | A | A | A |
| EVALUATION/ MEDIUM DUTY SIDE | BURYING PROPERTY | B | B | A | A | A | A |
| | GRANULARITY | B | B | B | A | A | A |
| | CHARACTER | A | A | A | B | B | B |
| | ABRASION RESISTANCE | A | A | A | A | A | A |
| | COLOR DEVELOPMENT PROPERTY | A | A | A | A | A | A |

TABLE 5

| | | No. | | | | | |
|---|---|---|---|---|---|---|---|
| | | EXAMPLE 5 | | | EXAMPLE 6 | | |
| SUBSTRATE TYPE | | HIGH-QUALITY PAPER | CAST PAPER | FILM | HIGH-QUALITY PAPER | CAST PAPER | PP |
| SUBSTRATE NAME | | 55PW | GLOSS PW | PET50A | 55PW | GLOSS PW | PP WHITE |
| PERMEABILITY | | HIGH | LOW | NO | HIGH | LOW | NO |
| TREATMENT LIQUID | COMPOSITION | A1 | A1 | B1 | A1 | A1 | B1 |
| | lw [ng] | 5 | 5 | 3 | 5 | 5 | 3 |
| | DOT PATTERN | IRREGULAR | IRREGULAR | IRREGULAR | REGULAR | REGULAR | REGULAR |
| | ADHESION AMOUNT mg/inch2 (INK HIGH DUTY) | 1.2 | 1.2 | 1.2 | 0.6 | 0.6 | 0.6 |
| | ADHESION AMOUNT mg/inch2 (INK MEDIUM DUTY) | 0.6 | 0.6 | 0.6 | 0.6 | 0.6 | 0.6 |
| | TIME LAG TO INK ADHESION [sec] | | 0.6 | | | 0.6 | |
| SURFACE TEMPERATURE AT ADHESION | | | 25° C. | | | 25° C. | |
| INK | | | C1 | | | C1 | |
| CLEAR INK | COMPOSITION | | CL1 | | | CL1 | |
| | RECORDING METHOD | REGULAR | REGULAR | REGULAR | REGULAR | REGULAR | REGULAR |
| EVALUATION/HIGH DUTY SIDE | BURYING PROPERTY | A | A | A | A | A | A |
| | GRANULARITY | B | B | B | B | B | B |
| | CHARACTER | B | B | B | B | B | B |

TABLE 5-continued

|  |  | | | | | | |
|---|---|---|---|---|---|---|---|
| EVALUATION/MEDIUM DUTY SIDE | ABRASION RESISTANCE | A | A | A | A | A | A |
| | COLOR DEVELOPMENT PROPERTY | A | A | A | B | A | A |
| | BURYING PROPERTY | A | A | A | A | A | A |
| | GRANULARITY | B | B | B | A | A | B |
| | CHARACTER | B | B | B | B | B | A |
| | ABRASION RESISTANCE | A | A | A | A | A | A |
| | COLOR DEVELOPMENT PROPERTY | A | A | A | A | A | A |

| | | No. | | | | | |
|---|---|---|---|---|---|---|---|
| | | EXAMPLE 7 | | | EXAMPLE 8 | | |
| SUBSTRATE TYPE | | HIGH-QUALITY PAPER | CAST PAPER | FILM | HIGH-QUALITY PAPER | CAST PAPER | FILM |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A2 | A2 | B1 | A1 | A1 | B1 |
| | lw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.2 | 1.2 | 1.2 | 1.2 |
| | ADHESION AMOUNT mg/inch2 (INK MEDIUM DUTY) | 0.6 | 0.6 | 0.6 | 1.2 | 1.2 | 1.2 |
| | TIME LAG TO INK ADHESION [sec] | | 1.0 | | | 0.6 | |
| SURFACE TEMPERATURE AT ADHESION | | | 25° C. | | | 25° C. | |
| INK | | | C1 | | | C1 | |
| CLEAR INK | COMPOSITION | | CL1 | | | CL1 | |
| | RECORDING METHOD | REGULAR | REGULAR | REGULAR | REGULAR | REGULAR | REGULAR |
| EVALUATION/HIGH DUTY SIDE | BURYING PROPERTY | A | A | A | A | A | A |
| | GRANULARITY | B | B | B | A | A | B |
| | CHARACTER | B | B | A | B | B | A |
| | ABRASION RESISTANCE | A | A | A | A | A | A |
| | COLOR DEVELOPMENT PROPERTY | B | A | A | A | A | A |
| EVALUATION/MEDIUM DUTY SIDE | BURYING PROPERTY | B | B | A | B | B | B |
| | GRANULARITY | B | B | B | B | B | B |
| | CHARACTER | B | B | A | A | A | A |
| | ABRASION RESISTANCE | A | A | A | B | B | B |
| | COLOR DEVELOPMENT PROPERTY | B | A | A | A | A | A |

TABLE 6

| | | No. | | | | | |
|---|---|---|---|---|---|---|---|
| | | EXAMPLE 9 | | | COMPARATIVE EXAMPLE 1 | | |
| SUBSTRATE TYPE | | HIGH-QUALITY PAPER | CAST PAPER | FILM | HIGH-QUALITY PAPER | CAST PAPER | PP |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A | A1 | B1 | A1 | A1 | A1 |
| | lw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.2 | 1.2 | 1.2 | 1.2 |
| | ADHESION AMOUNT mg/inch2 (INK MEDIUM DUTY) | 0.6 | 0.6 | 0.6 | 0.6 | 0.6 | 0.6 |
| | TIME LAG TO INK ADHESION [sec] | | 0.6 | | | 0.6 | |
| SURFACE TEMPERATURE AT ADHESION | | | 25° C. | | | 25° C. | |
| INK | | | C1 | | | C1 | |
| CLEAR INK | COMPOSITION | | — | | | CL1 | |
| | RECORDING METHOD | — | — | — | REGULAR | REGULAR | REGULAR |
| EVALUATION/HIGH DUTY SIDE | BURYING PROPERTY | A | A | A | A | A | C |
| | GRANULARITY | B | B | B | A | A | C |

TABLE 6-continued

|  |  | | | | | | |
|---|---|---|---|---|---|---|---|
|  | CHARACTER | A | A | A | B | B | A |
|  | ABRASION RESISTANCE | B | B | B | A | A | C |
|  | COLOR DEVELOPMENT PROPERTY | A | A | A | A | A | C |
| EVALUATION/MEDIUM DUTY SIDE | BURYING PROPERTY | A | A | A | A | A | C |
|  | GRANULARITY | B | B | B | A | A | C |
|  | CHARACTER | A | A | A | B | B | A |
|  | ABRASION RESISTANCE | B | B | B | A | A | C |
|  | COLOR DEVELOPMENT PROPERTY | A | A | A | A | A | C |

|  |  | No. | | | | | |
|---|---|---|---|---|---|---|---|
|  |  | COMPARATIVE EXAMPLE 2 | | | EXAMPLE 15 | | |
| SUBSTRATE TYPE | | HIGH-QUALITY PAPER | CAST PAPER | FILM | HIGH-QUALITY PAPER | CAST PAPER | PP |
| SUBSTRATE NAME | | 55PW | GLOSS PW | PET50A | 55PW | CAST 73 | PP WHITE |
| PERMEABILITY | | HIGH | LOW | NO | HIGH | LOW | NO |
| TREATMENT LIQUID | COMPOSITION | B1 | B1 | B1 | A1 | A1 | B1 |
|  | lw [ng] | 5 | 5 | 3 | 5 | 5 | 5 |
|  | DOT PATTERN | REGULAR | REGULAR | REGULAR | REGULAR | REGULAR | REGULAR |
|  | ADHESION AMOUNT mg/inch2 (INK HIGH DUTY) | 1.2 | 1.2 | 1.2 | 1.2 | 1.2 | 1.2 |
|  | ADHESION AMOUNT mg/inch2 (INK MEDIUM DUTY) | 0.6 | 0.6 | 0.6 | 0.6 | 0.6 | 0.5 |
|  | TIME LAG TO INK ADHESION [sec] |  | 0.6 |  |  | 0.6 |  |
| SURFACE TEMPERATURE AT ADHESION | |  | 25° C. |  |  | 25° C. |  |
| INK | |  | C1 |  |  | C1 |  |
| CLEAR INK | COMPOSITION |  | CL1 |  |  | CL1 |  |
|  | RECORDING METHOD | REGULAR | REGULAR | REGULAR | REGULAR | REGULAR | REGULAR |
| EVALUATION/HIGH DUTY SIDE | BURYING PROPERTY | B | B | A | A | A | A |
|  | GRANULARITY | C | C | B | A | A | B |
|  | CHARACTER | C | C | A | B | B | A |
|  | ABRASION RESISTANCE | A | A | A | A | A | A |
|  | COLOR DEVELOPMENT PROPERTY | C | B | A | A | A | A |
| EVALUATION/MEDIUM DUTY SIDE | BURYING PROPERTY | B | B | A | A | A | B |
|  | GRANULARITY | C | C | B | A | A | B |
|  | CHARACTER | C | C | A | B | B | B |
|  | ABRASION RESISTANCE | A | A | A | A | A | A |
|  | COLOR DEVELOPMENT PROPERTY | C | B | A | A | A | A |

TABLE 7

|  |  | No. | | | | | |
|---|---|---|---|---|---|---|---|
|  |  | EXAMPLE 10 | | | EXAMPLE 11 | | |
| SUBSTRATE TYPE | | HIGH-QUALITY PAPER | CAST PAPER | FILM | HIGH-QUALITY PAPER | CAST PAPER | PP |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A4 | A4 | B3 | A1 | A1 | B1 |
|  | lw [ng] | 5 | 5 | 3 | 5 | 5 | 3 |
|  | DOT PATTERN | REGULAR | REGULAR | REGULAR | REGULAR | REGULAR | REGULAR |
|  | ADHESION AMOUNT mg/inch2 (INK HIGH DUTY) | 1.2 | 1.2 | 1.2 | 1.2 | 1.2 | 1.2 |
|  | ADHESION AMOUNT mg/inch2 (INK MEDIUM DUTY) | 0.6 | 0.6 | 0.6 | 0.6 | 0.6 | 0.6 |
|  | TIME LAG TO INK ADHESION [sec] |  | 0.6 |  |  | 0.6 |  |
| SURFACE TEMPERATURE AT ADHESION | |  | 25° C. |  |  | 45° C. |  |
| INK | |  | C1 |  |  | C1 |  |
| CLEAR INK | COMPOSITION |  | CL1 |  |  | CL1 |  |
|  | RECORDING METHOD | REGULAR | REGULAR | REGULAR | REGULAR | REGULAR | REGULAR |

TABLE 7-continued

| | | | | | | | |
|---|---|---|---|---|---|---|---|
| EVALUATION/HIGH DUTY SIDE | BURYING PROPERTY | A | A | A | A | B | B |
| | GRANULARITY | A | A | B | A | B | B |
| | CHARACTER | B | B | A | A | A | A |
| | ABRASION RESISTANCE | A | A | A | A | A | A |
| | COLOR DEVELOPMENT PROPERTY | A | A | A | A | B | B |
| EVALUATION/MEDIUM DUTY SIDE | BURYING PROPERTY | A | A | A | A | B | B |
| | GRANULARITY | A | A | B | A | B | B |
| | CHARACTER | B | B | A | A | A | A |
| | ABRASION RESISTANCE | A | A | A | A | A | A |
| | COLOR DEVELOPMENT PROPERTY | A | A | A | A | B | B |

| | | No. | | | | | |
|---|---|---|---|---|---|---|---|
| | | EXAMPLE 12 | | | COMPARATIVE EXAMPLE 3 | | |
| SUBSTRATE TYPE | | HIGH-QUALITY PAPER | CAST PAPER | FILM | HIGH-QUALITY PAPER | CAST PAPER | FILM |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A1 | A1 | A3 | A3 | A3 | B1 |
| | lw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.2 | 1.2 | 1.2 | 1.2 |
| | ADHESION AMOUNT mg/inch2 (INK MEDIUM DUTY) | 0.6 | 0.6 | 0.6 | 0.6 | 0.6 | 0.6 |
| | TIME LAG TO INK ADHESION [sec] | | 0.6 | | | 0.6 | |
| SURFACE TEMPERATURE AT ADHESION | | | 25° C. | | | 25° C. | |
| INK | | | C1 | | | C1 | |
| CLEAR INK | COMPOSITION | | CL1 | | | CL1 | |
| | RECORDING METHOD | REGULAR | REGULAR | REGULAR | REGULAR | REGULAR | REGULAR |
| EVALUATION/HIGH DUTY SIDE | BURYING PROPERTY | A | A | B | A | A | A |
| | GRANULARITY | A | A | B | C | C | B |
| | CHARACTER | B | B | A | C | C | A |
| | ABRASION RESISTANCE | A | A | B | A | A | A |
| | COLOR DEVELOPMENT PROPERTY | A | A | B | A | A | A |
| EVALUATION/MEDIUM DUTY SIDE | BURYING PROPERTY | A | A | B | A | A | A |
| | GRANULARITY | A | A | B | C | C | B |
| | CHARACTER | B | B | A | C | C | A |
| | ABRASION RESISTANCE | A | A | B | A | A | A |
| | COLOR DEVELOPMENT PROPERTY | A | A | B | A | A | A |

TABLE 8

| | | No. | | | | | |
|---|---|---|---|---|---|---|---|
| | | EXAMPLE 13 | | | EXAMPLE 14 | | |
| SUBSTRATE TYPE | | HIGH-QUALITY PAPER | CAST PAPER | FILM | HIGH-QUALITY PAPER | CAST PAPER | FILM |
| SUBSTRATE NAME | | 55PW | GLOSS PW | PET50A | 55PW | GLOSS PW | PET50A |
| PERMEABILITY | | HIGH | LOW | NO | HIGH | LOW | NO |
| TREATMENT LIQUID | COMPOSITION | A1 | A1 | B1 | A1 | A1 | B1 |
| TREATMENT LIQUID (FIRST PASS) | lw [ng] | 5 | 5 | 3 | 5 | 5 | 3 |
| | DOT PATTERN | REGULAR | REGULAR | REGULAR | REGULAR | REGULAR | REGULAR |
| | ADHESION AMOUNT mg/inch2 (INK HIGH DUTY) | 1.2 | 1.2 | 1.5 | 1.2 | 1.2 | 0.9 |
| | ADHESION AMOUNT mg/inch2 (INK MEDIUM DUTY) | 0.6 | 0.6 | — | 0.6 | 0.6 | 0.5 |
| | TIME LAG TO INK ADHESION [sec] | | 0.6 | | | 0.6 | |
| INK (FIRST PASS) | COMPOSITION | C1 | C1 | W1 | C1 | C1 | C1 |
| TREATMENT LIQUID | lw [ng] | — | — | 3 | — | — | 3 |

TABLE 8-continued

| | | EXAMPLE 13 | | | EXAMPLE 14 | | |
|---|---|---|---|---|---|---|---|
| (SECOND PASS) | DOT PATTERN | — | — | REGULAR | — | — | REGULAR |
| | ADHESION AMOUNT mg/inch2 (INK HIGH DUTY) | — | — | 0.9 | — | — | 1.5 |
| | ADHESION AMOUNT mg/inch2 (INK MEDIUM DUTY) | — | — | 0.5 | — | — | — |
| | TIME LAG TO INK ADHESION [sec] | — | — | 0.6 | — | — | 0.6 |
| INK (SECOND PASS) | COMPOSITION | — | — | C1 | — | — | W1 |
| SURFACE TEMPERATURE AT ADHESION | | | 25° C. | | | 25° C. | |
| EVALUATION/HIGH DUTY SIDE | BURYING PROPERTY | A | A | A | A | A | A |
| | GRANULARITY | A | A | A | A | A | A |
| | CHARACTER | B | B | B | B | B | B |
| | ABRASION RESISTANCE | A | A | B | A | A | B |
| | COLOR DEVELOPMENT PROPERTY | A | A | A | A | A | A |
| EVALUATION/MEDIUM DUTY SIDE | BURYING PROPERTY | A | A | A | A | A | A |
| | GRANULARITY | A | A | A | A | A | A |
| | CHARACTER | B | B | B | B | B | B |
| | ABRASION RESISTANCE | A | A | B | A | A | B |
| | COLOR DEVELOPMENT PROPERTY | A | A | A | A | A | A |

4.5. Evaluation Method 4.5.1. Burying Property

After a solid pattern was printed under the conditions described in the above "4.4. RECORDING TEST", a printed matter thus obtained was visually observed and then evaluated by the following evaluation criteria.

Evaluation Criteria
  A: Burying property is preferable.
  B: Burying property is a little bit inferior (some spots of recording medium are not covered with ink).
  C: Burying property is inferior (large number of spots of recording medium is not covered with ink).

4.5.2. Granularity

After a solid pattern was printed under the conditions described in the above "4.4. RECORDING TEST", a printed matter thus obtained was visually observed and then evaluated by the following evaluation criteria. In addition, as for the granularity, the granularity may occur when the reaction of the ink is excessively advanced or may occur by bleeding irregularity due to insufficient reaction.

Evaluation Criteria
  A: No granularity is observed.
  B: Granularity is observed but is inconspicuous.
  C: Granularity is conspicuous.

4.5.3. Character

After a character printing was performed under the conditions described in the above "4.4. RECORDING TEST", a printed matter thus obtained was visually observed and then evaluated by the following evaluation criteria. Rank B or higher was regarded as preferable.

Evaluation Criteria
  A: Character line is sharp and readable.
  B: Character line is not sharp but readable without causing problems.
  C: Character line is not sharp and not readable.

4.5.4. Abrasion Resistance

After a solid pattern was printed under the conditions described in the above "4.4. RECORDING TEST", a printed matter thus obtained was dried for 2 minutes in a temperature constant bath at 70° C. and was then left at room temperature over one night. Subsequently, after a solid pattern printed portion was cut into rectangles having a size of 30×200 mm and then rubbed 50 times by a Gakushin-type fastness rubbing tester (with load of 500 g) using a plain woven cloth, the degree of peeling of the ink was visually observed and then evaluated by the following evaluation criteria. Rank B or higher was regarded as preferable.

Evaluation Criteria
  A: No peeling is observed.
  B: Peeling is observed in less than 50% of evaluation area.
  C: Peeling is observed in 50% or more of evaluation area.

4.5.5. Color Development Property

After a solid pattern was printed under the conditions described in the above "4.4. RECORDING TEST", an OD value of a printed matter thus obtained was measured and then evaluated by the following evaluation criteria. Rank B or higher was regarded as preferable.

Evaluation Criteria
  A: Printed matter has a high OD value and is colorful even by visual inspection.
  B: Printed matter has not a high OD value but is colorful by visual inspection.
  C: Printed matter has a low OD value.

4.6. Evaluation Result

The evaluation results are shown in the above Tables 4 to 8.

As shown in the above Tables 4 to 8, it was found that from the example of the ink set which includes a water-based ink composition containing a colorant, a first treatment liquid containing an aggregating agent, and a second treatment liquid containing an aggregating agent and in which a content of the aggregating agent in the first treatment liquid is 0.60 mol/kg or more, a content of the aggregating agent in the second treatment liquid is less than 0.60 mol/kg, the first treatment liquid is used together with the ink composition for recording on a recording medium which is a low-permeable substrate, and the second treatment liquid is used together with the ink composition for recording on a recording medium which is an impermeable substrate; from the example of the recording apparatus which performs recording on a recording medium and which includes the ink set described above, and the recording includes a first recording to perform recording on a recording medium which is a low-permeable substrate using the ink composition and the first treatment liquid and a second recording to perform recording on a recording medium which is an impermeable substrate using the ink composition and the second treatment liquid; and from the example of the recording method which performs recording on a recording medium using the ink set described above and which includes a step of selecting a treatment liquid used for the recording from the first treatment liquid and the second treatment liquid, a step of adhering the selected treatment liquid to the recording medium, and a step of adhering the ink composition to the recording medium, and the recording is a first recording in which the selected treatment liquid is the first treatment liquid and the recording medium is a low-permeable substrate or a second recording in which the selected treatment liquid is the second treatment liquid and the recording medium is an impermeable substrate, in both the recorded matter including a low-permeable substrate and the recorded matter including an impermeable substrate, excellent image quality (burying property and granularity) and abrasion resistance can be obtained.

From the comparison between Example 1 and Comparative Examples 1 and 2, it was found that when the ink set includes only one of the first treatment liquid and the second treatment liquid described above, in both the recorded matter including a low-permeable substrate and the recorded matter including an impermeable substrate, excellent image quality (burying property and granularity) and abrasion resistance cannot be obtained.

From the comparison between Example 1 and Comparative Example 3, it was found that when the content of the aggregating agent of the first treatment liquid included in the ink set described above is not 0.60 mol/kg or more, in both the recorded matter including a low-permeable substrate and the recorded matter including an impermeable substrate, excellent image quality (granularity and character) cannot be obtained.

From the results of Examples 1 and 2, it was found that by various types of low-permeable substrates and impermeable substrates used as the recording media, excellent image quality and abrasion resistance can be obtained.

From the results of Examples 1, 3, 4, 10, and 12, it was found that by various types of aggregating agents at various contents, excellent image quality and abrasion resistance can be obtained.

From the results of Examples 1 and 5, it was found that when the liquid droplets of the treatment liquid are adhered to form a regular pattern, the image quality tends to be made more excellent.

From the results of Examples 1, 6, and 8, it was found that in accordance with the adhesion amount of the ink composition, when the adhesion amount of the treatment liquid has two levels or more, the image quality and the abrasion resistance tend to be made more excellent.

From the results of Examples 1 and 7, it was found that when the maximum time lag between the adhesion of the treatment liquid and the adhesion of the ink composition is within a predetermined time, the image quality tends to be made more excellent.

From the results of Examples 1 and 9, it was found that when the step of adhering the clear ink composition containing a resin to the recording medium is further included, the abrasion resistance tends to be made more excellent.

From the results of Examples 1 and 11, it was found that when the heating is intentionally not performed in the primary drying step, the image quality tends to be made more excellent.

From the results of Examples 13 and 14, it was found that even when the white ink composition is used, in both the recorded matter including a low-permeable substrate and the recorded matter including an impermeable substrate, excellent image quality and abrasion resistance can be obtained.

From the results of Examples 2 and 15, it was found that when the liquid droplet mass of the treatment liquid in recording on an impermeable substrate is smaller than the liquid droplet mass of the treatment liquid in recording on a permeable substrate, the image quality in the recording on an impermeable substrate is made more excellent.

From the embodiments described above, the following conclusions can be obtained.

An ink set according to one aspect of the present disclosure comprises: a water-based ink composition containing a colorant; a first treatment liquid containing an aggregating agent; and a second treatment liquid containing an aggregating agent, a content of the aggregating agent in the first treatment liquid is 0.60 mol/kg or more, a content of the aggregating agent in the second treatment liquid is less than 0.60 mol/kg, the first treatment liquid is used together with the ink composition for recording on a recording medium which is a low-permeable substrate, and the second treatment liquid is used together with the ink composition for recording on a recording medium which is an impermeable substrate.

According to the aspect of the ink set described above, the low-permeable substrate may satisfy the following equation (1) when a permeability in the low-permeable substrate 60 seconds after water dripping is represented by A, and the impermeable substrate may not satisfy the following equation (1) when a permeability in the impermeable substrate 60 seconds after water dripping is represented by A.

$$10 \log_{10}(A/A_0) < -5 \text{ [dB]} \qquad \text{Equation (1)}$$

$A_0$ represents a permeability in a standard substrate 60 seconds after water dripping, and A represents a permeability in an object substrate 60 seconds after water dripping.

According to any one of the aspects of the ink set described above, the aggregating agent contained in the first treatment liquid may have a solubility of 100 g or more with respect to 100 g of water at 20° C., and the aggregating agent contained in the second treatment liquid may have a solubility of less than 100 g with respect to 100 g of water at 20° C.

According to any one of the aspects of the ink set described above, the aggregating agent contained in the first treatment liquid and the aggregating agent contained in the second treatment liquid may be polyvalent metal salts.

According to any one of the aspects of the ink set described above, the first treatment liquid may be further used together with the ink composition for recording on a recording medium which is a permeable substrate.

According to any one of the aspects of the ink set described above, the ink composition may include a non-white ink composition and may further include a white ink composition.

A recording apparatus to perform recording on a recording medium according to another aspect of the present disclosure is an apparatus which includes the ink set according to any one of the aspects described above, and the recording includes a first recording to perform recording on a recording medium which is a low-permeable substrate using the ink composition and the first treatment liquid and a second recording to perform recording on a recording medium which is an impermeable substrate using the ink composition and the second treatment liquid.

According to the aspect of the recording apparatus described above, in the first recording and the second recording, the treatment liquid may be adhered to the recording medium by an ink jet method; in the first recording, the treatment liquid in a first liquid droplet mass may be ejected and adhered to the recording medium; and in the second recording, the treatment liquid in a second liquid droplet mass which is smaller than the first liquid droplet mass may be ejected and adhered to the recording medium.

A recording method according to another aspect of the present disclosure to perform recording on a recording medium using the ink set according to any one of the aspects described above comprises a step of selecting a treatment liquid used for the recording from the first treatment liquid and the second treatment liquid; a step of adhering the selected treatment liquid to the recording medium; and a step of adhering the ink composition to the recording medium, and the recording is a first recording in which the selected treatment liquid is the first treatment liquid and the recording medium is a low-permeable substrate or a second recording in which the selected treatment liquid is the second treatment liquid and the recording medium is an impermeable substrate.

According to the aspect of the recording method described above, the treatment liquid may be adhered in an amount of 1.5 mg/inch² or less.

According to any one of the aspects of the recording method described above, the ink composition and the treatment liquid may be adhered to the recording medium by an ink jet method.

According to any one of the aspects of the recording method described above, the treatment liquid may be adhered in the form of liquid droplets to form a regular pattern.

According to any one of the aspects of the recording method described above, the treatment liquid and the ink composition may be ejected in the same scanning and adhered to the recording medium so as to be overlapped with each other, and the maximum time lag between the adhesion of the treatment liquid and the adhesion of the ink composition may be one second or less.

According to any one of the aspects of the recording method described above, the adhesion amount of the treatment liquid may have two levels or more in accordance with an adhesion amount of the ink composition.

According to any one of the aspects of the recording method described above, the treatment liquid may have a recording resolution of 1,200×1,200 dpi or more.

According to any one of the aspects of the recording method described above, the method may further comprise a step of adhering a clear ink composition containing a resin to the recording medium.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. An ink set comprising:
a water-based ink composition containing a colorant; a first treatment liquid containing an aggregating agent; and
a second treatment liquid containing an aggregating agent,
wherein a content of the aggregating agent in the first treatment liquid is 0.60 mol/kg or more,
a content of the aggregating agent in the second treatment liquid is less than 0.60 mol/kg,
the first treatment liquid is used together with the ink composition for recording on a recording medium which is a low-permeable substrate,
the second treatment liquid is used together with the ink composition for recording on a recording medium which is an impermeable substrate,
wherein the low-permeable substrate satisfies the following equation (1) when a permeability in the low-permeable substrate 60 seconds after water dripping is represented by A, and
the impermeable substrate does not satisfy the following equation (1) when a permeability in the impermeable substrate 60 seconds after water dripping is represented by A, $$10 \log_{10}(A/A_0) < -5 \text{ [dB]} \quad \text{Equation (1)}$$

where $A_0$ represents a permeability in a standard substrate 60 seconds after water dripping, and A represents a permeability in an object substrate 60 seconds after water dripping.

2. The ink set according to claim 1,
wherein the low-permeable substrate satisfies the following equation (1) when a permeability in the low-permeable substrate 60 seconds after water dripping is represented by A, and
the impermeable substrate does not satisfy the following equation (1) when a permeability in the impermeable substrate 60 seconds after water dripping is represented by A, $$10 \log_{10}(A/A_0) < -8 \text{ [dB]} \quad \text{Equation (1)}$$

where $A_0$ represents a permeability in a standard substrate 60 seconds after water dripping, and A represents a permeability in an object substrate 60 seconds after water dripping.

3. The ink set according to claim 1,
wherein the aggregating agent contained in the first treatment liquid has a solubility of 100 g or more with respect to 100 g of water at 20° C., and
the aggregating agent contained in the second treatment liquid has a solubility of less than 100 g with respect to 100 g of water at 20° C.

4. The ink set according to claim 1,
wherein the aggregating agent contained in the first treatment liquid and the aggregating agent contained in the second treatment liquid are polyvalent metal salts.

5. The ink set according to claim 1,
wherein the first treatment liquid is further used together with the ink composition for recording on a recording medium which is a permeable substrate.

6. The ink set according to claim 1,
wherein the ink composition includes a non-white ink composition and further includes a white ink composition.

7. A recording apparatus to perform recording on a recording medium, including the ink set according to claim 1,
wherein the recording includes:
a first recording to perform recording on a recording medium which is a low-permeable substrate using the ink composition and the first treatment liquid, and
a second recording to perform recording on a recording medium which is an impermeable substrate using the ink composition and the second treatment liquid.

8. The recording apparatus according to claim 7,
wherein in the first recording and the second recording, the treatment liquid is adhered to the recording medium by an ink jet method,
in the first recording, the treatment liquid in a first liquid droplet mass is ejected and adhered to the recording medium, and
in the second recording, the treatment liquid in a second liquid droplet mass which is smaller than the first liquid droplet mass is ejected and adhered to the recording medium.

9. A recording method to perform recording on a recording medium using the ink set according to claim 1, the method comprising:
selecting a treatment liquid used for the recording from the first treatment liquid and the second treatment liquid;
adhering the selected treatment liquid to the recording medium; and
adhering the ink composition to the recording medium,
wherein the recording is:
a first recording in which the selected treatment liquid is the first treatment liquid and the recording medium is a low-permeable substrate; or
a second recording in which the selected treatment liquid is the second treatment liquid and the recording medium is an impermeable substrate.

10. The recording method according to claim 9,
wherein the treatment liquid is adhered in an amount of 1.5 mg/inch$^2$ or less.

11. The recording method according to claim 9,
wherein the ink composition and the treatment liquid are adhered to the recording medium by an ink jet method.

12. The recording method according to claim 11,
wherein the treatment liquid is adhered in the form of liquid droplets to form a regular pattern.

13. The recording method according to claim 11,
wherein the treatment liquid and the ink composition are ejected in the same scanning and are adhered to the recording medium so as to be overlapped with each other, and the maximum time lag between the adhesion of the treatment liquid and the adhesion of the ink composition is one second or less.

14. The recording method according to claim 11,
wherein an adhesion amount of the treatment liquid has two levels or more in accordance with an adhesion amount of the ink composition.

15. The recording method according to claim 11,
wherein the treatment liquid has a recording resolution of 1,200×1,200 dpi or more.

16. The recording method according to claim 9, further comprising: adhering a clear ink composition containing a resin to the recording medium.

* * * * *